(12) United States Patent
Mahmoud et al.

(10) Patent No.: US 11,709,471 B2
(45) Date of Patent: Jul. 25, 2023

(54) DISTRIBUTED AUTOMATED SYNTHESIS OF CORRECT-BY-CONSTRUCTION CONTROLLERS

(71) Applicant: Technische Universität München, Munich (DE)

(72) Inventors: Mahmoud Khaled Mohamed Mahmoud, Höhenkirchen (DE); Majid Zamani, Munich (DE)

(73) Assignee: Technische Universität München, Munich (DE)

( * ) Notice: Subject to any disclaimer, the term of this patent is extended or adjusted under 35 U.S.C. 154(b) by 209 days.

(21) Appl. No.: 17/281,568

(22) PCT Filed: Oct. 2, 2019

(86) PCT No.: PCT/EP2019/076738
§ 371 (c)(1),
(2) Date: Mar. 30, 2021

(87) PCT Pub. No.: WO2020/070206
PCT Pub. Date: Apr. 9, 2020

(65) Prior Publication Data
US 2021/0389743 A1     Dec. 16, 2021

(30) Foreign Application Priority Data

Oct. 4, 2018   (EP) .................................... 18198616

(51) Int. Cl.
*G05B 19/00*     (2006.01)
*G05B 19/042*     (2006.01)
(Continued)

(52) U.S. Cl.
CPC .......... *G05B 19/0426* (2013.01); *G06F 8/30* (2013.01); *G06F 17/13* (2013.01); *G05B 2219/24168* (2013.01)

(58) Field of Classification Search
CPC ...... G05B 19/0426; G05B 2219/24168; G06F 8/30; G06F 17/13
See application file for complete search history.

(56) References Cited

U.S. PATENT DOCUMENTS

| | | | |
|---|---|---|---|
| 8,793,275 B1 * | 7/2014 | Gough | G06F 16/248 707/770 |
| 2005/0102723 A1 * | 5/2005 | Van Den Nieuwelaar | G05B 19/41865 718/1 |

(Continued)

OTHER PUBLICATIONS

Zhao, Dongbin, Zhongpu Xia, and Ding Wang. "Model-free optimal control for affine nonlinear systems with convergence analysis." IEEE Transactions on Automation Science and Engineering 12.4 (2014): 1461-1468. (Year: 2014).*

Ernst, Damien, Pierre Geurts, and Louis Wehenkel. "Tree-based batch mode reinforcement learning." Journal of Machine Learning Research 6 (2005). (Year: 2005).*

Mao, Chao, and Zuojun Shen. "A reinforcement learning framework for the adaptive routing problem in stochastic time-dependent network." Transportation Research Part C: Emerging Technologies 93 (2018): 179-197. (Year: 2018).*

(Continued)

*Primary Examiner* — Michael D Masinick
(74) *Attorney, Agent, or Firm* — Seed IP Law Group LLP

(57) ABSTRACT

A method includes: receiving a mathematical model of a control system, with state variables and control parameters; discretizing at least a part of a space to obtain a set of tuples; determining for each tuple at least one successor state; obtaining an initial winning set of tuples; determining an updated winning set of tuples, including comparing the at least one successor state with the initial winning set of tuples, where the comparison is distributed over available processing elements by choosing one processing element from the available processing elements for each tuple to perform the comparison and where the available processing elements are used simultaneously at least in part; repeating the determination of the updated winning set of tuples to obtain a new updated winning set of tuples if a convergence (Continued)

measure does not meet a criterion, and constructing a controller for the control system from the new updated winning set.

20 Claims, 8 Drawing Sheets

(51) Int. Cl.
  *G06F 8/30* (2018.01)
  *G06F 17/13* (2006.01)

(56) References Cited

U.S. PATENT DOCUMENTS

| | | | |
|---|---|---|---|
| 2009/0217235 A1 | 8/2009 | Suenbuel | |
| 2012/0191446 A1 | 7/2012 | Binsztok et al. | |
| 2014/0310714 A1* | 10/2014 | Chan | G06F 16/285 718/102 |
| 2015/0112501 A1* | 4/2015 | Rombouts | H02J 3/14 700/295 |
| 2017/0277193 A1 | 9/2017 | Frazzoli et al. | |
| 2017/0336788 A1 | 11/2017 | Iagnemma | |
| 2018/0004206 A1 | 1/2018 | Iagnemma et al. | |

OTHER PUBLICATIONS

Mickelin, Oscar, Necmiye Ozay, and Richard M. Murray. "Synthesis of correct-by-construction control protocols for hybrid systems using partial state information." 2014 American Control Conference. IEEE, 2014. (Year: 2014).*

Reissig et al., "Feedback Refinement Relations for the Synthesis of Symbolic Controllers," *IEEE Transactions on Automated Control* 62(4): 1-16, 2016.

Rungger et al., "SCOTS: A Tool for the Synthesis of Symbolic Controllers," in *HSCC '16: Proceedings of the 19$^{th}$ International Conference on Hybrid Systems: Computation and Control*, HSCC, Vienna, Austria, Apr. 12-14, 2016, pp. 99-104.

Raman et al., "Mixed-Integer Linear Programming for Planning with Temporal Logic Tasks (Position Paper)," in *Planning, Search, and Optimization: Papers from the 2015 AAAI Workshop*, Association for the Advancement of Artificial Intelligence, Austin, Texas USA, Jan. 25-26, 2015, pp. 100-101.

International Search Report and Written Opinion, dated Feb. 6, 2020, for International Application No. PCT/EP2019/076738, 14 pages.

M. Zamani, et al., "Symbolic Models for Nonlinear Control Systems Without Stability Assumptions," in *IEEE Transactions on Automatic Control* 57(1): 1804-1809, Jul. 2012.

* cited by examiner

DISTRIBUTED AUTOMATED SYNTHESIS OF CORRECT-BY-CONSTRUCTION CONTROLLERS

BACKGROUND

Technical Field

The invention relates to a method and a device to synthesize correct-by-construction controllers for a control system.

Description of the Related Art

Autonomous physical systems like robots have become ubiquitous in industrial applications and recent advances in sensor and computer technology have opened up new possibilities like autonomous driving or interconnected networks of robots. The increasing complexity of such cyber-physical systems with a tight integration of physical systems, sensors, communication networks and computer systems, however, requires novel approaches for the control of these systems, which are capable of handling large amounts of data and required to work reliably in a variety of situations, in particular since guaranteeing safety is crucial in many applications.

One technique to design suitable controllers is the synthesis of correct-by-construction controllers through symbolic controller synthesis, see P. Tabuada, "Verification and Control of Hybrid Systems A Symbolic Approach", Springer US (2009) and M. Zamani et al., "Symbolic models for nonlinear control systems without stability assumptions", IEEE Trans. Autom. Control 57, 1804-1809 (2012). This approach is based on describing the dynamics of a given control system by a discrete symbolic model. For a set of specifications to be imposed on the control system, a symbolic controller can be synthesized using the symbolic model, which by construction meets the required specifications in the symbolic model, see O. Maler et al., "On the synthesis of discrete controllers for timed systems", in: STACS 95, Springer, pp. 229-242 (1995) and A. Pnueli et al., "On the synthesis of an asynchronous reactive module", in: Proceedings of the 16th International Colloquium on Automata, Languages and Programing, Springer, pp. 652-671 (1989). The symbolic controller can subsequently be refined to obtain a controller for the real control system.

This technique is applicable to a wide range of systems and can be automated to automatically synthesize controllers starting from a mathematical model of the control system dynamics and the desired specifications.

However, due to the exponential complexity of this task with the number of state variables and input parameters, currently available tools are limited to control systems with only very few state variables and input parameters and can require large amounts of computing time, see, e.g., M. Mazo et al., "Pessoa: A tool for embedded controller synthesis", in: Computer Aided Verification, Springer, pp. 566-569 (2010) and M. Rungger et al., "SCOTS: A tool for the synthesis of symbolic controllers", in: Proceedings of the 19th International Conference on Hybrid Systems: Computation and Control, ACM, pp. 99-104 (2016). They are thus not suitable for most potential applications, especially if the controller synthesis is to be performed in real time.

U.S. 2009/0217235 A1 discloses a method for self-debugging a computer program operating in a distributed processing environment. A fault in a plurality of processing devices is detected and classified according to fault classifications in order to execute a response specified by the fault classifications for revising the computer program.

U.S. 2012/0191446 A1 describes a system for building a parser generator, which generates a parser for a grammar and comprises modules for verifying that the grammar is well-formed and belongs to a predetermined class of grammars as well as that semantic actions embedded in the grammar are terminating semantic actions.

BRIEF SUMMARY

The object of the invention is thus to provide a method and a device for a fast and resource-efficient synthesis of correct-by-construction controllers, which is applicable to a large range of control systems.

This object is met by embodiments of a method, a computer program, as described herein.

The method for synthesizing a correct-by-construction controller for a control system comprises the following steps: (1) receiving a mathematical model of the control system with a plurality of state variables $\vec{x}$ and a plurality of control parameters $\vec{u}$, wherein the mathematical model characterizes at least in part the change of the state variables $\vec{x}$ in response to the control parameters $\vec{u}$ as a control input; (2) receiving at least one specification for the state variables $\vec{x}$ and/or the control parameters $\vec{u}$; (3) identifying available processing elements; (4) discretizing at least a part of a space spanned by $(\vec{x}, \vec{u})$ to obtain a set of tuples $(\vec{x}_i, \vec{u}_j)$; (5) determining based on the mathematical model for each tuple $(\vec{x}_i, \vec{u}_j)$ in the set of tuples at least one successor state $\vec{x}_f$; (6) obtaining an initial winning set of tuples based on said at least one specification; (7) determining an updated winning set of tuples, wherein said determination comprises comparing the at least one successor state $\vec{x}_f$ of each tuple with the initial winning set of tuples, wherein said comparison is distributed over the available processing elements by choosing one processing element from the available processing elements for each tuple to perform the comparison and wherein the available processing elements are used simultaneously at least in part; receiving information pertaining said comparison from the processing elements; and determining the updated winning set of tuples based on said information; (8) comparing the updated winning set with the initial winning set to obtain a convergence measure; (9) repeating said determination of the updated winning set of tuples to obtain a new updated winning set of tuples if said convergence measure does not meet a predefined convergence criterion, wherein the previous updated winning set of tuples is used as the initial winning set for said determination and is provided at least in part to the available processing elements; and (10) constructing a controller for the control system from said new updated winning set of tuples. The numbering of the steps above is for clarity only and does not indicate a certain order. As far as technically feasible, the steps can be permuted and the method and any embodiment thereof can be performed in an arbitrary order.

This method provides a fast and efficient way to synthesize correct-by-construction controllers. By distributing the comparison of the successor states with the initial target set or the previous updated target set over multiple processing elements, the issue of computation time increasing exponentially with the complexity of the control system can be converted into a resource problem, for which the computation time decreases with the number of available processing elements. With this, one can take advantage of the massive parallel computing capabilities offered by modern systems like computing clusters or cloud computing. This enables the synthesis of correct-by-construction controllers for a wide range of control systems, especially control systems with a large number of state variables and/or control parameters. Previously, symbolic controller synthesis was not suited for such systems due to the limited computing time in practical applications. In particular, the method facilitates the synthesis of controllers for systems in continuously changing environments, which can require frequent updates of the controller and thus can require strict deadlines for the times spent for controller synthesis.

In the first step, a mathematical model of the control system is received. This mathematical model describes the state of the control system by a plurality of state variables, which can be expressed in the form of a state vector $\vec{x}$ containing the state variables $x^{(1)}, x^{(2)}, x^{(n)}$. The control input to the control system is described by a plurality of control parameters $u^{(1)}, u^{(2)}, \ldots, u^{(n)}$ expressed as a control vector $\vec{u}$. These parameters are to be used by the controller to control the state of the control system, i.e., the goal of the controller is to determine the control input $\vec{u}$ depending on the current state $\vec{x}$ provided to the controller. Each of the state variables and each of the control parameters may be a continuous or discrete quantity. The state variables span a continuous state space and the control parameters span a continuous input space.

The mathematical model characterizes the response of the control system to the control input $\vec{u}$ at least in part, i.e., an estimate for the change of the state variables can be determined based on the mathematical model given the current state $\vec{x}$. The mathematical model can describe the dynamics of the control system exactly or approximately. The mathematical model may for example comprise a set of differential equations $\dot{\vec{x}} = f(\vec{x}, \vec{u})$. Alternatively, the mathematical model may contain information based on which a response of the control system can be determined, e.g., a Hamiltonian, a Lagrangian, a set of intrinsic parameters of the control system and/or any other mathematical description of the control system.

In addition to the mathematical model, at least one specification for the state variables $\vec{x}$ and/or the control parameters $\vec{u}$ is received. The at least one specification can for example contain one or more target states or a range of target states, which the control system should reach; one or more safe states or a range of safe states, which the system should remain in; and/or one or more unsafe states or a range of unsafe states, which the control system should avoid. The at least one specification may comprise a set of boundary conditions, i.e., ranges for one or more state variables and/or ranges for one or more control parameters that the system should not exceed. If the at least one specification is more than one specification, the specifications may have priorities associated with them. For example, the at least one specification may comprise secondary specifications that are not to be enforced strictly, but that can be optimized for if possible.

The method comprises identifying available processing elements, i.e., processing elements that can be used at least in part for the execution of computation tasks. The available processing elements may be distributed over multiple computation devices and may contain processing elements of different types of computation devices, e.g., central processing units (CPUs), graphic processing units (GPUs), field-programmable gate arrays (FPGAs), application specific integrated circuits (ASICs) and other types of hardware accelerators (HWAs). The identification of available processing elements may be repeated multiple times, e.g., to update the list of available processing elements at different points in time while performing the method.

At least a part of a space spanned by the state variables and control parameters is discretized, wherein the respective range for each continuous state variable and each continuous control parameter is converted into a set of discrete values. The discretized space is a set of tuples, or pairs, $(\vec{x}_i, \vec{u}_j)$, where i and j are indices labelling the state vectors and control vectors, respectively. For each state variable and control parameter, the spacing between the discrete values may be inhomogeneous and the range to be discretized may consist of multiple intervals.

After the discretization, at least one successor state $\vec{x}_f$ is determined for each tuple $(\vec{x}_i, \vec{u}_j)$ in the set of tuples, wherein said determination is based on the mathematical model. The at least one successor state can for example be a state that the control system is expected to be in according to the mathematical model, if the control system is initially in the state $\vec{x}_i$ and the control input $\vec{u}_j$ is applied for a certain amount of time. The time may be chosen depending on the control system, the mathematical model and/or the method used for determining the at least one successor state. If the at least one successor state is not contained in the discretized state space, it may be approximated by the closest state from the discretized state space. A symbolic model of the control system may be obtained from the successor sates by defining a set of transition rules associating each tuple $(\vec{x}_i, \vec{u}_j)$ to the corresponding at least one successor state $\vec{x}_f$.

Based on the at least one specification, an initial winning set of tuples is chosen from the set of tuples, wherein the initial winning set consists of at least one tuple. The initial winning set of tuples can for example contain tuples associated with one or more target states, e.g., by combining one or more target states determined by the at least one specification with one or more control vectors, which may also be chosen based on the at least one specification.

In the next step, an updated winning set of tuples is determined from a comparison of the at least one successor state of each tuple with the initial winning set of tuples. This comparison is performed by distributing the associated computation tasks over the available processing elements. To this end, for each tuple in the set of tuples one processing element from the available processing elements is chosen. This processing element executes the computation tasks to compare the at least one successor state of this tuple with the initial winning set of tuples. Thereby, the set of tuples is divided into subsets, each of which is assigned to a different processing element of the available processing elements. For each processing element, a queue of tasks may be determined for performing the comparison for each tuple within the respective subset. The queue of tasks may contain multiple sequences of tasks, wherein each sequence of tasks comprises the tasks for comparing the at least one successor state of one tuple with the initial winning set of tuples. The queue of tasks can be sent to the respective processing element for execution. The available processing elements are used simultaneously at least in part, i.e., at least two of the available processing elements execute computation tasks in parallel at at least one point in time during this step.

Subsequently, information pertaining said comparison is received from the processing elements. This information may be provided by the processing elements after performing the comparison for the entire corresponding subset or may be provided sequentially whenever the comparison has been performed for one or more tuples. Based on this information, an updated winning set of tuples is determined from the set of tuples. Said information for a given tuple may for example be whether the tuple is to be included in the updated winning set of tuples or whether the initial winning set contains any tuples fulfilling certain conditions with respect to the at least one successor state of this tuple. Additionally, the at least one specification may also be taken into account for the determination of the winning set, e.g., additional conditions for tuples to be included in the updated winning set may be obtained from the at least one specification.

The updated winning set is compared with the initial winning set to obtain a convergence measure, wherein said convergence measure quantifies a degree of similarity between the two sets. This process may also be performed in parallel by distributing the comparison over the available processing elements. This convergence measure is compared to a predefined convergence criterion, which specifies a desired degree of similarity between the initial winning set and the updated winning set. If the convergence measure does not meet the predefined convergence criterion, the determination of the updated winning set of tuples is repeated to obtain a new updated winning set of tuples. This new updated winning set is determined as described above, wherein the updated winning set determined previously serves as the initial winning set, i.e., the initial winning set is replaced by the previous updated winning set. The previous updated winning set is thus provided at least in part to the available processing elements. To reduce the amount of data to be exchanged, the part of the previous updated winning set provided to an available processing element may be chosen such that it contains only tuples which are relevant for the comparison with the respective subset of tuples assigned to this processing element, e.g., based on bounds for the corresponding successor states. The distribution of the computation tasks over the available processing elements may be different from the distribution used previously. If the convergence measure meets the predefined convergence criterion, the previous updated winning set is defined to be the new updated winning set.

Finally, a controller for the control system is constructed from said new updated winning set of tuples. The controller comprises a set of rules, based on which a state vector $\vec{x}$ provided as an input can be uniquely associated to a control vector $\vec{u}$. The state vector can be from the continuous state space and the control vector can be in the continuous input space. Constructing the controller may comprise selecting tuples from the new updated winning set and the use of interpolation/extrapolation methods to obtain the set of rules, which can be applied to state vectors from the continuous state space.

In one example of the present invention, also the determination of the successor states can be performed by distributing the associated computation tasks over the available processing elements. For each tuple in the set of tuples, one processing element is chosen from the available processing elements. This processing element executes the computation tasks to determine the at least one successor state of this tuple. Thereby, the set of tuples is divided into subsets, each of which is assigned to a different processing element of the available processing elements. These subsets do not have to be identical to the subsets used for the comparison of the successor states with the initial winning set. For each processing element, a queue of tasks may be determined for performing the determination of the at least one successor state for each tuple within the respective subset. The queue of tasks may contain multiple sequences of tasks, wherein each sequence of tasks comprises the tasks for determining the at least one successor state of one tuple. The queue of tasks may be sent to the respective processing element for execution. The available processing elements can be used simultaneously at least in part during this step.

In a preferred embodiment, identifying the available processing elements may comprise determining a type of processing element for each available processing element. The type of processing element describes which kind of computation device the respective processing element belongs to, e.g., CPU, GPU or a type of HWA. Additionally, the type of processing element may contain information on the specific type of computation device, e.g., the type of CPU, GPU or HWA, and/or specifications like the clock speed or the memory resources. The determination of the successor states and/or the comparison of the successor states with the initial winning set can be adapted to the type of processing element for each available processing element. This adaptation may involve optimizing the instructions for executing the corresponding computing tasks based on the type of processing element, e.g., to exploit the large cache memory of CPUs or the parallel architecture of GPUs. The adaptation may be implemented by providing a kernel with implementations of the corresponding algorithms that are fine-tuned to the respective processing element.

In another example of the present invention, identifying available processing elements may further comprise determining the available computing power and/or the available memory resources of the available processing elements. For this, the computing power and memory resources of a processing element that are currently used, e.g., by other applications or processes, may be determined in addition to specifications contained in the type of the processing element. Furthermore, past usage statistics may be analyzed as well as information on future use if available.

In a preferred embodiment, the distribution over the available processing elements for the determination of the successor states and/or for the comparison of the successor states with the initial winning set can be determined based on the types of the available processing elements, the available computing power of the available processing elements, that memory resources of the available processing element or a combination thereof. For this, the size of the subsets that the set of tuples is divided into may be chosen based on this information about the available processing elements. In particular, the subsets may be selected in such a way that the available processing elements need the same time for executing the tasks assigned to them to reduce the total computation time required for these steps. For example, a subset assigned to a processing element with a high available computing power may be larger than a subset assigned to a different processing element with a lower available computing power. The subsets used for the determination of the successor states and the subsets used for the comparison of the successor states with the initial winning set may be different.

Alternatively or additionally, the distribution over the available processing elements for the determination of the successor states and/or for the comparison of the successor states with the initial winning set may be determined taking into account the communication overhead for exchanging data with the available processing elements. For example, the distribution for the successor state comparison may be chosen such that the amount of data that has to be exchanged with the available processing elements for obtaining the convergence measure and/or for repeating the determination of the updated winning set is minimized. The distribution for the determination of the successor states may be chosen in a way that reduces the data exchange required to perform the successor state comparison.

The method according to an embodiment of the present invention can further comprise iteratively repeating the determination of the updated winning set of tuples until the convergence measure meets the predefined convergence criterion. For this, every time a new updated winning set is determined, it is compared with the previous updated winning set to obtain the convergence measure. The convergence measure is compared to the predefined convergence criterion. If the convergence measure satisfies the convergence criterion, the method proceeds to the construction of the controller. Otherwise, another iteration of the determination of the updated winning set is performed. The new updated winning set used for the construction of the controller may also be referred to as final winning set. The convergence criterion may be the same for all iterations or may be adapted between two subsequent iterations. For example, the convergence criterion may be relaxed with the number of performed iterations in order to ensure a completion of the method or a maximum number of iterations may be specified.

In another example of the present invention, constructing the controller may comprise constructing a symbolic controller from the new updated winning set of tuples and refining said symbolic controller to obtain the controller. To construct the symbolic controller, a set of discrete rules may be extracted from the new updated winning set, wherein the set of rules uniquely identifies a control vector for a given state vector, $\vec{x}_i \rightarrow \vec{u}_j$. The set of discrete rules may be restricted to the discretized space or a subspace of the discretized space. Obtaining the set of discrete rules may involve a determination step, wherein a unique control vector is associated with a state vector $\vec{x}_i$, e.g., if the new updated winning set contains multiple tuples with the same state vector $\vec{x}_i$. The unique control vector may for example be determined by randomly selecting one of the multiple tuples or by averaging $\vec{u}_j$ over two or more of the multiple tuples. Alternatively, a tuple may be chosen based on secondary specifications.

The refinement of the symbolic controller is the generalization of the set of discrete rules of the symbolic controller to the set of rules of the controller, which can be applied to the continuous state space. In one example, the rules for the controller may be to approximate a continuous state vector $\vec{x}$ by the closest discrete state factor $\vec{x}_i$ and to use the discrete rules of the symbolic controller as a lookup table to determine the control vector. Alternatively, an average or weighted average of the control vectors associated with a plurality of discrete state vectors in the vicinity of $\vec{x}$ may be used. In other examples, interpolation and/or extrapolation may be performed for the refinement, e.g., to obtain a mathematical function mapping a state vector $\vec{x}$ to a control vector $\vec{u}(\vec{x})$.

The method according to an embodiment of the present invention can further comprise generating source code that can be used to implement the controller in a control unit. For this, the set of rules of the controller may be expressed as source code for a software and/or hardware implementation, e.g., C++ code for a software implementation or VHDL code for a hardware implementation. The source code may be provided to a control unit automatically or may be provided to a user, e.g., as a source code building block. When executing the source code, the control unit may be configured to determine a control vector according to the set of rules of the controller for a state vector provided as an input.

In a preferred embodiment, determining said at least one successor state comprises determining an upper bound and a lower bound for a set of successor states. To determine the at least one successor state for a tuple, a set of successor states may be calculated based on the mathematical model. This may allow for accounting for uncertainties, e.g., in the determination of the state vector, in the application of the control vector, in the mathematical model and/or in numerical methods used for determining successor states. For a given tuple, a set of successor states may be determined by calculating a successor state for a plurality of state vectors and/or a plurality of control vectors, for example within predetermined uncertainty ranges around $\vec{x}_i$ and $\vec{u}_j$, respectively, and/or by determining additional successor states for each calculated successor state, e.g., by adding or subtracting a predetermined uncertainty. To reduce memory requirements, the set of successor states may be characterized by a small number of states, e.g., a lower bound and an upper bound defining a hyper-rectangle in the state space. The at least one successor state may comprise the lower bound and the upper bound and/or a subset of the set of successor states.

In one example of the present invention, the discretization of at least a part of the space spanned by the state variables and control parameters may comprise mapping said part of the space to a lower-dimensional space, in particular a two-dimensional flat space. For the latter, the corresponding part of the state space as well as the corresponding part of the input space are mapped to a one-dimensional space each. This facilitates indexing of the tuples in the discretized space, e.g., using pairs of integer indices, and may be advantageous for performing computational tasks as well as for the storing of data.

In a preferred embodiment of the present invention, the discretization may be determined taking into account information on the mathematical model and/or the at least one specification. The subspaces of the state space and the input space to be discretized as well as the spacings used for the discretization may be chosen based on this. The chosen state subspace may for example be required to contain target states determined by the specification as well as the current state of the control system. Furthermore, the size of the subspaces to be discretized may be limited based on properties of the control system. In another example, the spacing may be non-uniform and may account for properties of the mathematical model, e.g., the spacing for a control parameter may be closer in regions where the state of the control system depends strongly on this parameter or the spacing for a state variable may be closer in a region where the mathematical model exhibits particular features.

The discretization can further be determined based on information pertaining the available processing elements. The size of the subspaces and the spacings may be chosen depending on the available computing power and/or memory resources. For example, the required computation time may be estimated and the size of the subspaces and the spacings may be chosen such that the estimated computation time is below a certain threshold.

In one example of the present invention, the mathematical model can comprise a system of differential equations or a set of differential equations may be derived from the mathematical model. In these cases, determining the at least one successor state may comprise numerically solving said system of differential equations at least in part, e.g., via a Runge-Kutta method or a linear multistep method.

Comparing the at least one successor state $\vec{x}_f$ of each tuple with the initial winning set of tuples may comprise determining whether the initial winning set contains at least one tuple $(\vec{x}_k, \vec{u}_l)$ with $\vec{x}_k = \vec{x}_f$. If the at least one successor state is a plurality of states, this determination may be performed for one or more states of the plurality of states. A tuple may for example be included in the updating winning set if this condition is fulfilled for all successor states of the tuple, i.e., the updated winning set contains all tuples $(\vec{x}_i, \vec{u}_j)$ with successor states $\vec{x}_f$ for which the initial winning set contains at least one tuple $(\vec{x}_k, \vec{u}_l)$ with $\vec{x}_k = \vec{x}_f$ for each of the at least one successor states of the tuple $(\vec{x}_i, \vec{u}_j)$. In other examples, a certain number of states or fraction of states of the at least one successor state fulfilling the aforementioned condition may be required.

If the at least one successor state comprises a lower bound and an upper bound, the comparison procedures discussed here may be conducted using a set of state vectors defined by the lower and upper bound instead of using the at least one successor state. Such a set of state vectors may for example contain the states enclosed by the hyper-rectangle connecting the lower and upper bound.

Additionally, it may be required that the tuple $(\vec{x}_i, \vec{u}_j)$ is already contained in the initial winning set in order for it to be included in the updated winning set. Furthermore, additional conditions for tuples to be included in the updated winning set may be obtained from the at least one specification. The at least one specification may for example specify boundaries for the state vector and/or control vector, e.g., a minimum value and/or maximum value for at least one of the state variables and/or control parameters.

In one example of the present invention, the convergence measure quantifies the overlap of the updated winning set with the initial winning set. The convergence measure can for example be the number of tuples that are only contained in one of the sets. Alternatively, the convergence measure can be the fraction of tuples that only contained in one of the sets, wherein the fraction is defined as the number of tuples contained in only one of the sets divided by the total number of tuples contained in both sets. The predefined convergence criterion may specify a minimum absolute or relative overlap, e.g., a maximum number or fraction of tuples that are only contained in one of the sets.

In another example of the present invention, the controller is provided to a control unit of the control system after it has been constructed. The controller may for example be provided by transmitting the corresponding set of rules or as a source code as discussed above. The controller may be provided to the control unit via a computer network, in particular the internet.

The control system may for example be a computer-controlled physical system, in particular a cyber-physical system. A computer-controlled physical system may comprise a plurality of sensors, which measure quantities characterizing the state of the control system and/or the surroundings of the control system. The sensors may be computer-controlled and the state variables may be determined automatically from the measured quantities. In one example, at least one of the state variables can characterize a position or velocity of a mechanical element of the control system, in particular a relative position or velocity. Other state variables may characterize a voltage, a current, a light intensity, a temperature, a pressure, a force, an acceleration, a mass, a length, an angle, a time and/or another physical quantity. In addition, the computer-controlled physical system may comprise a plurality of computer-controlled control elements, which perform actions depending on one or more of the control parameters. The computer-controlled physical system may comprise a plurality of independently controlled subsystems and/or may be operated in the vicinity of other computer-controlled physical systems. In particular, the computer-controlled physical system may be configured to communicate with other computer-controlled physical systems. The control unit may be part of the control system and may be configured to receive the state vector, e.g., as a plurality of digital signals and/or analog signals as well as to send the control vector, e.g., as a plurality of digital signals and/or analog signals.

In one example, the method according to the present invention can be performed in real-time during operation of the control system. For this, a mathematical model of the control system based on the current state and the current surroundings of the control system may be received or a general mathematical model of the control system may have been received at an earlier time and subsequently be updated based on the current state and the current surroundings of the control system, e.g., by receiving a plurality of variable parameters of the model. In particular, the method may be performed repeatedly in real-time during operation of the control system. The method may for example be performed with a fixed frequency, i.e., the method is repeated after a certain amount of time. Alternatively or additionally, the method may be performed whenever updated specifications are provided, whenever the state of the control system has changed or whenever another predefined condition is fulfilled. Each time the method is executed, a controller is synthesized, which subsequently may be put in action to control the control system until a new controller becomes available. Thereby, a continuous control of the control system can be achieved, which can adapt dynamically to changing surroundings.

The present invention also provides a computer program comprising computer-readable instructions, such that said instructions, when read by a computer device, cause said computer device to implement a method according to the invention.

Furthermore, the present invention provides a device for synthesizing a correct-by-construction controller for a control system using a method according to the invention. The device comprises (1) at least two processing elements; (2) a computing platform interface coupled to the at least two processing elements for exchanging data with the at least two processing elements; (3) a resource identification unit coupled to the computing platform interface for identifying available processing elements of the at least two processing elements; (4) an interface unit for receiving the mathematical model of the control system and the at least one specification and for providing the synthesized controller; (5) a management engine coupled to the resource identification manager and the interface unit for determining the distribution over the available processing elements for the determination of the successor states and for the comparison of the successor states with the initial winning set and for determining corresponding queues of tasks for execution on the available processing elements; and (6) a task scheduling unit coupled to the computing platform interface and the management engine for receiving said queues of tasks from the management engine and managing the execution of the queues of tasks on the available processing elements.

Each of the at least two processing elements may be a processing element of a CPU, a GPU, or a HWA, e.g., a FPGA or an ASIC. The at least two processing elements may belong to the same computational device, e.g., multiple cores of a CPU, or may be distributed over multiple computational devices, in particular computation devices of different types. Each of the at least two processing elements may have a memory resource associated therewith.

The at least two processing elements are coupled to a computing platform interface, which handles the exchange of data with the at least two processing elements. The computing platform interface may be configured to exchange data between each of the at least two processing elements and one or more additional components coupled to the computing platform interface. Furthermore the computing platform interface may be configured to exchange data between the at least two processing elements themselves.

The resource identification unit coupled to the computing platform interface is configured to determine which of the at least two processing elements can be used to execute at least some computation tasks associated with performing a method according to the invention. For this, the resource identification unit may be configured to obtain information regarding the at least two processing elements, in particular regarding the current state of the at least two processing elements.

The interface unit is configured to receive the mathematical model of the control system and the at least one specification as well as to provide the synthesized controller. For this, the interface unit may be configured to communicate with other devices, for example via wired connections like CAN, LAN, and/or USB and/or via wireless connections like WLAN. The interface unit may be connected to a control unit of the control system for directly providing the synthesized controller. Alternatively or additionally, the interface unit may be connected to another device, e.g., a computer, and/or comprise means for direct access by a user. The interface unit may further be configured to receive a request to perform a method according to the invention, e.g., as a digital or analog trigger signal.

The management engine is coupled to the resource identification manager and the interface unit. The management engine is configured to determine the distribution of computation tasks over the available processing elements for the comparison of the successor states with the initial winning set as described above, i.e., by dividing the set of tuples into subsets, each of which is assigned to a different processing element of the available processing elements. Furthermore, the management engine is configured to determine a queue of tasks for each of the available processing elements for performing the comparison for each tuple within the respective subset. The management engine may be configured to initiate the execution of a method according to the invention when the interface unit receives a request, the mathematical model and/or the at least one specification.

The task scheduling unit is coupled to the management engine and to the computing platform interface. The management engine is configured to provide the queues of tasks to the task scheduling unit. The task scheduling unit is configured to manage the execution of the queues of tasks on the respective processing elements. The task scheduling unit may additionally be configured to collect the results from the available processing elements as well as to manage the exchange of data between processing elements and with the processing elements via the computing platform interface as required.

In a preferred embodiment, the management engine can further be configured to determine the distribution of computation tasks over the available processing elements for the determination of the successor states as described above, i.e., by dividing the set of tuples into subsets, each of which is assigned to a different processing element of the available processing elements. Additionally, the management engine can be configured to determine a queue of tasks for each of the available processing elements for performing the determination of the at least one successor state for each tuple within the respective subset.

In an example of the present invention, the resource identification unit may be configured to determine the type of processing element for each available processing element. The type of processing element describes which kind of computation device the respective processing element belongs to, e.g., CPU, GPU or a type of HWA. Additionally, the type of processing element may contain information on the specific type of computation device, e.g., the type of CPU, GPU or HWA, and/or specifications like the clock speed or the memory resources.

In another example of the present invention, the resource identification unit can be configured to determine the computing power and/or available memory resources of the available processing elements. For this purpose, the resource identification unit may be configured to determine the computing power and memory resources that are currently used, e.g., by other applications or processes, in addition to specifications contained in the type of a processing element. The resource identification unit may further be configured to analyze past usage statistics of the available processing elements as well as information on future use if available.

In particular, the resource identification manager may be configured to determine the computing power of the available processing elements by executing tasks associated with the determination of the successor states and/or the comparison of the successor states on the available processing elements. In this way, an estimate of the actual computing power of the available processing elements may be obtained. The resource identification manager may for example be configured to perform the determination of the at least one successor state for one tuple on each of the available processing elements and to measure the elapsed time. Alternatively or additionally, the resource identification manager may, e.g., be configured to perform the comparison of the at least one successor state of one tuple with the initial winning set on each of the available processing elements and measure the elapsed time.

As mentioned above, the processing elements may be processing elements of a CPU, a GPU, a FPGA, an ASIC and/or another type of hardware accelerator.

In one example of the present invention, the interface unit may be configured to receive the mathematical model of the control system and the at least one specification as well as to provide the synthesized controller via a computer network, in particular the Internet. The interface unit may further be configured to receive a request to perform a method according to the invention via a computer network.

In an example of the present invention, the device can further comprises a logging unit, which is coupled to the management engine. The logging unit may be configured to receive data from the management engine, to store this data and to provide it to the management engine at a later time. The logging unit may further be configured for external access via the interface unit. The management engine may be configured to send data to the logging unit, e.g., debugging data or protocol data relating to the execution of a method according to the invention.

BRIEF DESCRIPTION OF THE SEVERAL VIEWS OF THE DRAWINGS

In the following, a detailed description of the invention and exemplary embodiments thereof is given with reference to the figures. The figures show schematic illustrations of FIG. 1: a symbolic controller synthesis method according to prior art

DETAILED DESCRIPTION

Figure 1:
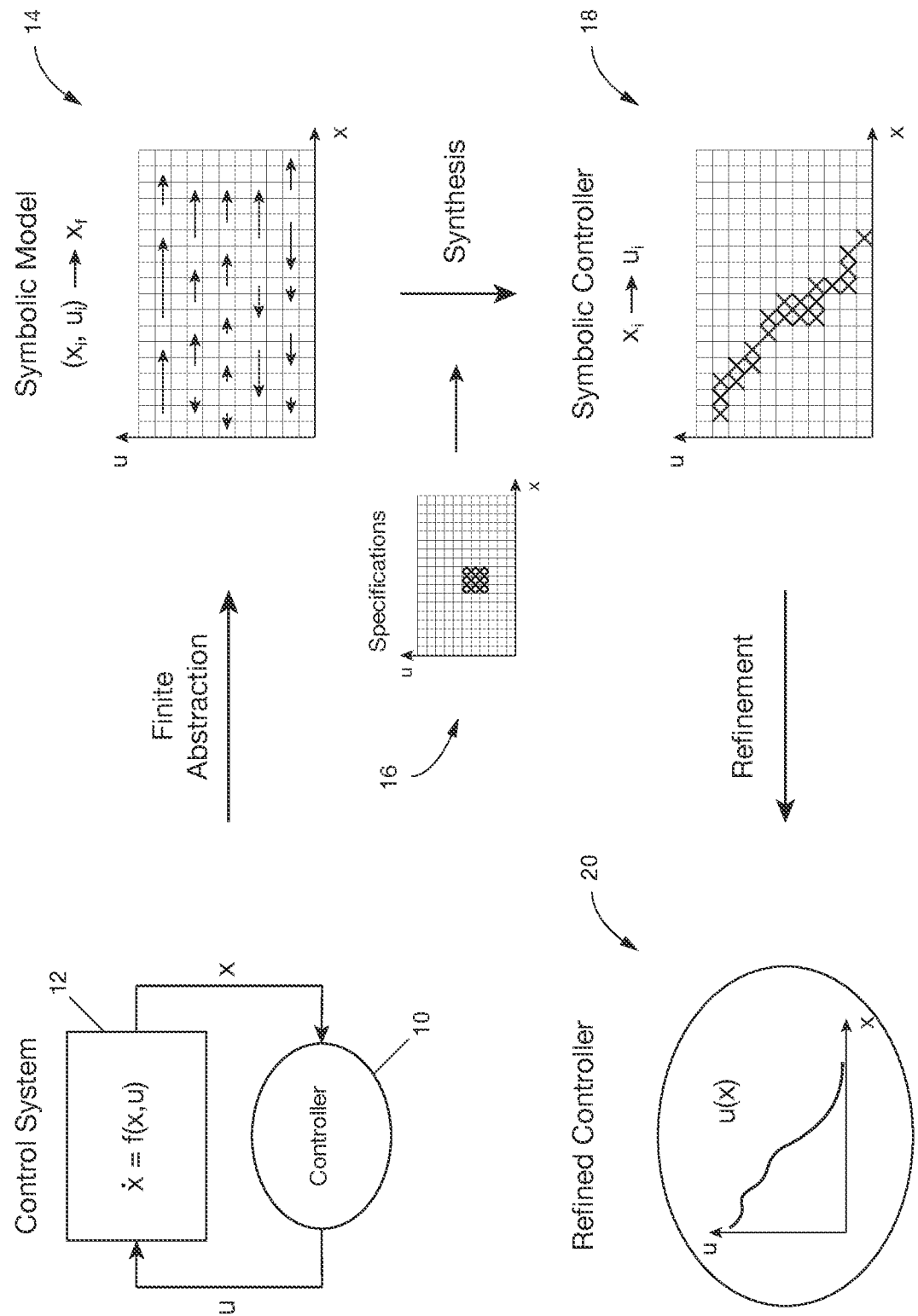

FIG. 1 schematically illustrates the concept of symbolic controller synthesis as known from prior art. The aim is to design a controller 10 for a control system 12, wherein the controller 10 comprises a set of rules to be executed by a control unit. The current state of the control system 12 is characterized by a plurality of state variables $x^{(1)}$, $x^{(2)}, \ldots, x^{(n)}$ and can be described by a state vector $\vec{x}$ containing all of the state variables. The control system 12 has a number of control parameters $u^{(1)}, u^{(2)}, \ldots, u^{(m)}$, which can be used to control the state of the control system 12 and are described by a control vector $\vec{u}$ containing the control parameters. The set of rules of the controller 10 relate a state vector $\vec{x}$ a control vector $\vec{u}$.

The control system 12 can for example be an automated physical system like an autonomous car. In this case, the state variables could be the position and velocity of the car and the control parameters could be the position of the throttle and the angle of the steering wheel. In the following, an autonomous car is often used as an example for illustration. However, this should not in any sense be understood as a limitation for the subject-matter of the invention, which relates to the synthesis of controllers for technical control systems of any kind. Such control systems could for example be other automated physical systems like robots or cyber-physical systems like smart homes, smart grids or industrial process control systems.

The control unit receives the current state $\vec{x}$ of the control system 12 as well as a set of specifications for the control system 12 describing a target state of the control system 12 and possibly a set of boundary conditions. In the case of an autonomous car, the target state could for example by a target position and the boundary conditions could be the speed limit and the boundaries of the road. Based on the specifications, the controller 10 should determine a set of control parameters $\vec{u}$ to meet the specifications, i.e., to reach the target state under the imposed boundary conditions. A car could for example be accelerated to reach a certain target velocity by changing the position of the throttle or the car's steering wheel could be controlled to autonomously reach a pre-defined target position, e.g., some coordinates specified by a passenger using a navigator device.

The response of the control system 12 in a given state $\vec{x}$ to the control input $\vec{u}$ can be described by a mathematical model, which relates the change in the state $\vec{x}$ to the current state $\vec{x}$ and the control input $\vec{u}$. This mathematical model can for example be a set of differential equations $$\dot{\vec{x}} = f(\vec{x}, \vec{u})$$

The mathematical model forms the basis for designing the controller 10. To obtain a suitable controller 10, the mathematical model has to capture the essential dynamics of the control system 12 at least approximately. Depending on the complexity of the control system 12, obtaining a suitable model may be a difficult task on its own.

In symbolic controller synthesis, a controller 10 is constructed in three steps, which are illustrated in FIG. 1 and detailed in the following: (1) finite abstraction of the mathematical model to obtain a symbolic model 14, (2) synthesis of a symbolic controller 18 based on the symbolic model 14 and the set of specifications 16, and (3) refinement of the symbolic controller 18 to obtain a refined controller 20 for the actual control system 12.

In the first step, the continuous space spanned by the state variables $\vec{x}$ and the control parameters $\vec{u}$ is discretized to obtain a discrete space comprising a set of tuples $(\vec{x}_i, \vec{u}_j)$, where i and j are indices labelling the state vectors and control vectors, respectively. Subsequently, a successor state $\vec{x}_f$ is determined for each tuple $(\vec{x}_i, \vec{u}_j)$ using the mathematical model, wherein $\vec{x}_f$ corresponds to the state that the control system 12 is expected to end up in if it is initially in state $\vec{x}_i$ and the control input $\vec{u}_j$ is applied for a predefined amount of time. Obtaining the successor state may involve solving the mathematical model exactly or numerically. The resulting symbolic model 14 thus consists of a plurality of transition rules associating each tuple $(\vec{x}_i, \vec{u}_j)$ to a successor state $\vec{x}_f$. In FIG. 1, the higher-dimensional discrete space is illustrated by mapping it to a flat 2D space using the indices i and j as coordinates such that a tuple $(\vec{x}_i, \vec{u}_j)$ corresponds to the square at position (i,j). Accordingly, the transition rules are depicted as horizontal arrows linking a tuple $(\vec{x}_i, \vec{u}_j)$ with the tuple $(\vec{x}_f, \vec{u}_j)$ corresponding to the successor state $\vec{x}_f$ at the same control vector $\vec{u}_j$. For clarity, the transition rules are shown only for a select subset of tuples.

In the following step, a symbolic controller 18 is synthesized based on the symbolic model 14 and the specifications 16 for the control system 12. This synthesis is conducted in such a way that the symbolic controller 18 automatically meets the specifications 16 when applied to the symbolic model 14. The resulting symbolic controller 18 is hence "correct-by-construction". As detailed below, this can for example be achieved by an iterative determination of a final winning set of tuples that forms a fixed-point set with respect to one or more target states, i.e., when applying a feedback based on the final winning set to the control system 12, the control system 12 will remain within the final winning set and will eventually converge towards the target states.

At first, an initial winning set is defined, which can, e.g., be the target states. This winning set is then updated iteratively, wherein each iteration comprises the following steps: The successor states for all tuples in the discrete space are obtained from the symbolic model 14. For each tuple, the successor state is compared to the initial winning set and based on this comparison an updated winning set is defined. For example, each tuple with a successor state $\vec{x}_f$, for which the initial winning set contains a tuple $(\vec{x}_i, \vec{u}_j)$ with $\vec{x}_i = \vec{x}_f$, can be added to the updated winning set, whereas tuples for which the aforementioned condition is not met are not contained in the updated winning set. Alternatively, the updated winning set could only contain tuples that meet the aforementioned condition and are from the initial winning set. Afterwards, the initial winning set and the updated winning set are compared to obtain a convergence measure, e.g., an overlap between the sets, and by comparing this convergence measure with a convergence criterion a decision is made whether to perform another iteration or to terminate the iterative determination. Before beginning with the next iteration, the initial winning set is redefined by replacing it with the updated winning set. In this way, the initial winning set can change from iteration to iteration, wherein new tuples may enter the set and/or other tuples previously contained in the set may leave the set.

The convergence criterion can be chosen such that it ensures that the final updated winning set, also referred to as final winning set, forms a fixed-point set as defined above. The convergence criterion can be the equivalence between the initial and the updated winning sets, i.e., the iteration can be continued until the initial winning set and the updated winning set are identical. For example, when using the aforementioned condition to determine the updated winning set, this would be the case when for each tuple in the initial winning set a tuple exists in the initial winning set for which the state vector is identical to the successor state of the former.

This facilitates the generation of the symbolic controller 18, which comprises a set of rules that identify a control vector for a given state vector, $\vec{x}_i \rightarrow \vec{u}_j$. These rules can be obtained from the final updated winning set, e.g., by averaging u over all tuples in the final updated winning set with a given $\vec{x}_i$ or randomly selecting a tuple from the tuples in the final updated winning set with a given $\vec{x}_i$. By construction, this symbolic controller 18 will enforce the specifications 16 provided initially in a discrete control system whose dynamics are governed by the symbolic model 14.

Finally, the symbolic controller 18 is refined to obtain a refined controller 20 for the actual control system 12, i.e., a controller capable of handling state vectors from the continuous state space. This refinement can involve an interpolation and/or extrapolation process to extract rules that can be applied to a continuous state vector from the discrete set of rules of the symbolic controller 18. These rules can for example comprise a mathematical function mapping a state vector $\vec{x}$ to a control vector $\vec{u}(\vec{x})$. The refined controller 20 is then designed such that it provides a control vector to the control system 12 according to these rules in response to a state vector as an input. Alternatively, the refined controller 20 could approximate a continuous state vector by a discrete state vector contained in the discrete state space and use the rules of the symbolic controller 18 as a look-up table.

Figure 2A:
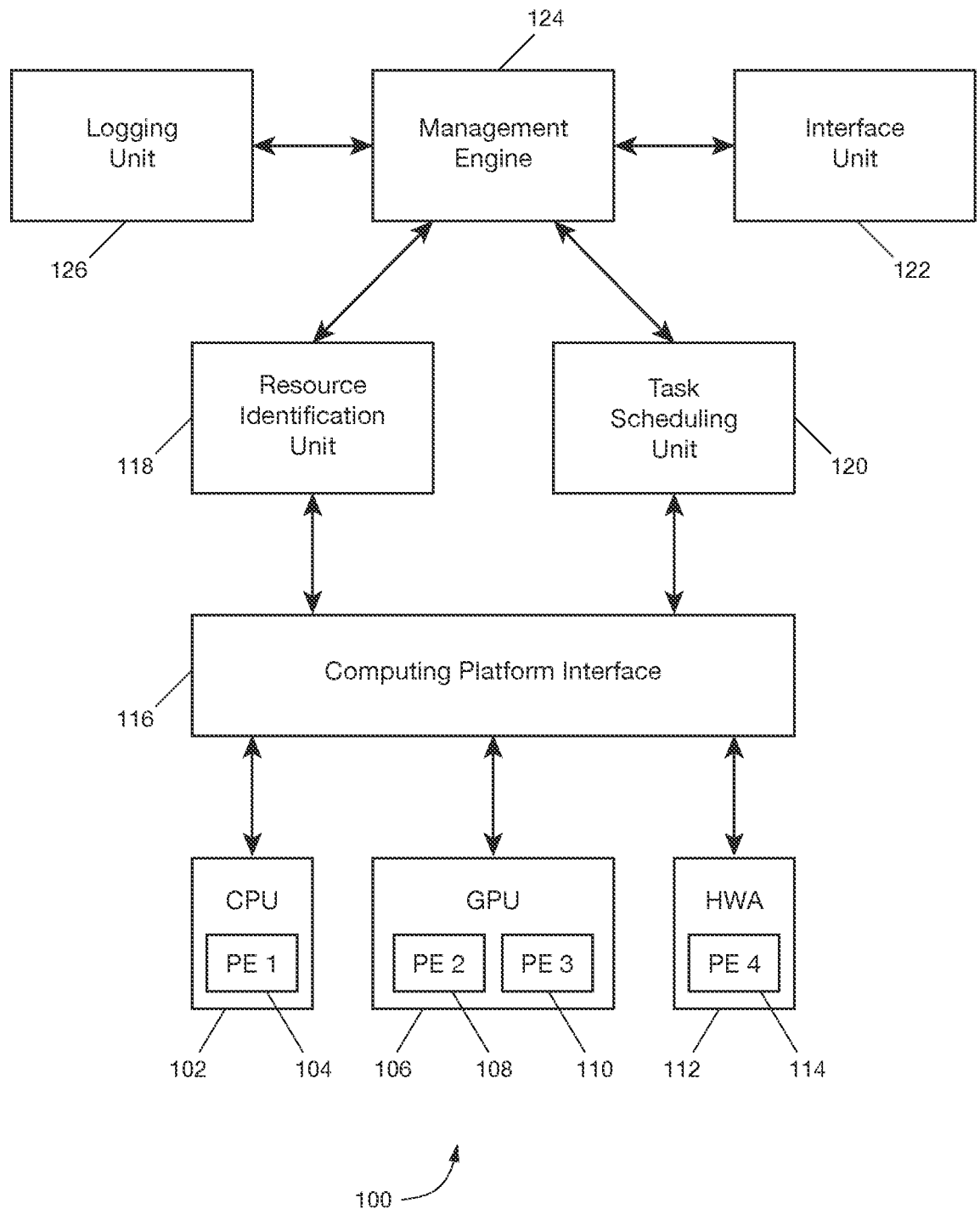
FIG. 2a: a device for synthesizing a correct-by-construction controller according to an exemplary embodiment of the invention
Figure 2B:
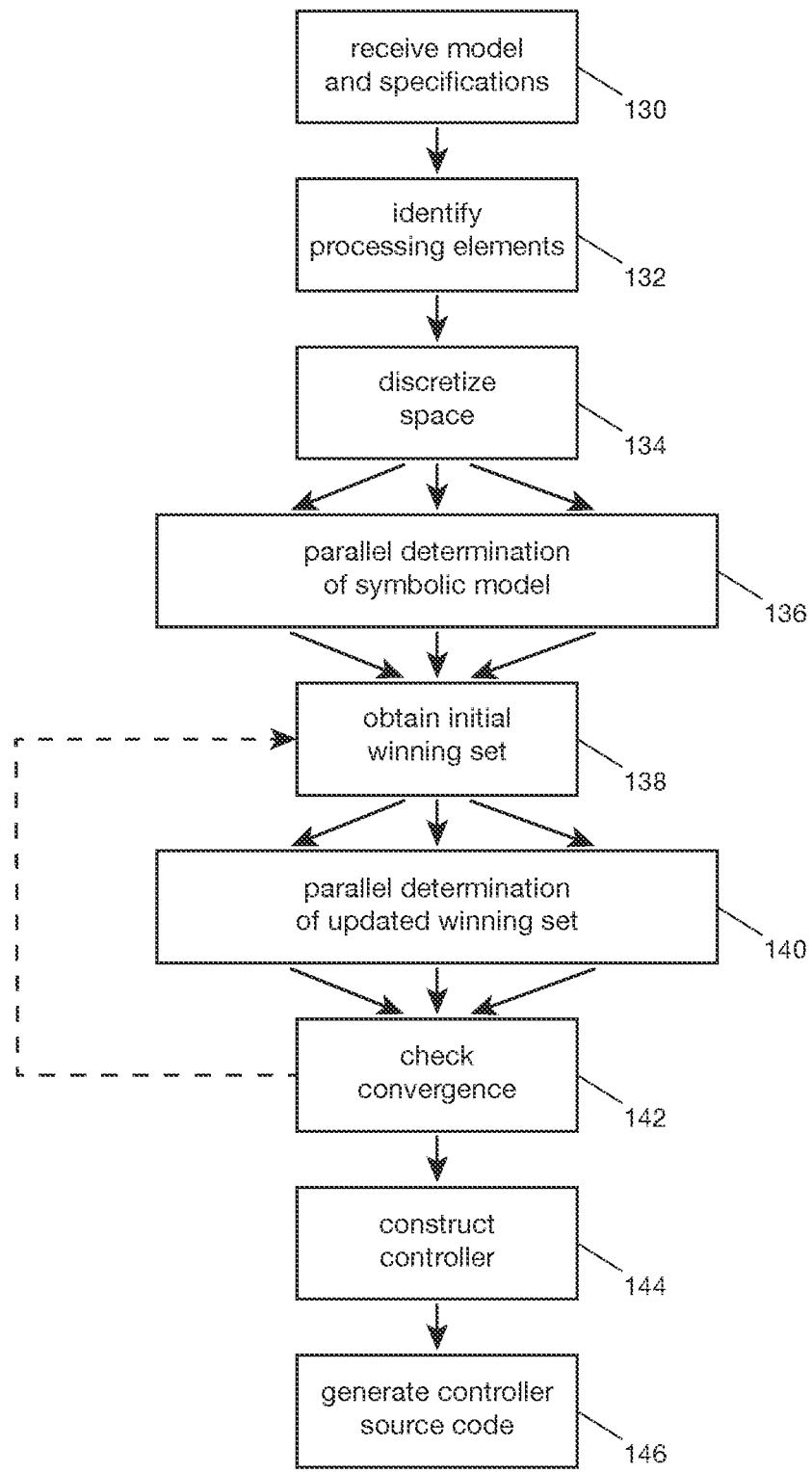
FIG. 2b: a flow chart of a method to synthesize a correct-by-construction controller in accordance with an embodiment of the invention

FIG. 2a shows an example for a device 100 according to an embodiment of the present invention, which can be used to implement a method as depicted in FIG. 2b. The device 100 comprises a central processing unit (CPU) 102 with a processing element 104, a graphics processing unit (GPU) 106 with a two processing elements 108, 110 as well as a hardware accelerator (HWA) 112 with a processing element 114. Each of the processing elements 104, 108, 110 and 114 can have a memory resource associated therewith. Alternatively or additionally, processing elements within the same computation device, e.g., processing elements 108 and 110, may share a common memory resource. With a variety of processing elements at hand, the device 100 is capable of matching the requirements of various applications by distributing tasks over the processing elements 104, 108, 110, and 114. CPUs, for example, are suitable for complex serial mathematical computations, which may arise when constructing the symbolic model, e.g., for solving differential equations numerically. GPUs, on the other hand, typically contain many, but less-powerful processing elements and are thus particularly well suited for a massive parallelization of tasks, e.g., for computing the updated winning set. HWAs, e.g., an FPGA, can operate in a low-power mode, which may be advantageous for embedded applications that require real-time execution of the provided method.

The processing elements 104, 108, 110 and 114 are coupled to a computing platform interface 116, which handles the exchange of data between the processing elements 104, 108, 110 and 114 and components connected with the computing platform interface 116. Data may be exchanged between the processing elements 104, 108, 110 and 114 themselves as well as between each of the processing elements 104, 108, 110 and 114 and each of the components connected with the computing platform interface 116. Additionally, processing elements within the same computation device, e.g., processing elements 108 and 110, may be configured to exchange data with each other independent of the computing platform interface 116.

In the example shown in FIG. 2a, a resource identification unit 118 and a task scheduling unit 120 are coupled to the computing platform interface 116. The resource identification unit 118 is configured to identify available processing elements that can be used at least in part for the execution of tasks associated with the method according to the invention. Additionally, the resource identification unit 118 is configured to determine the type of processing element for the available processing elements, i.e., which kind of computation device the respective processing element belongs to, e.g., CPU, GPU or a type of HWA. The resource identification unit 118 may further be configured to obtain information regarding the available computing power and/or memory resources of each of the available processing elements as detailed below.

The device 100 further comprises an interface unit 122 for communication with other devices, in particular to receive the specifications 240 and the mathematical model of the control system 12 for which a controller is to be synthesized and to provide the synthesized controller. For this, the interface unit 122 may be configured to communicate via wired connections, e.g., CAN, LAN or USB, and/or via wireless connections like WLAN. The interface unit 122 may be directly connected to the control unit of the control system 12. Alternatively or additionally, the interface unit 122 may be connected to another device, e.g., a computer, and/or comprise means for direct access by a user.

The core part of the device 100 is the management engine 124, which is coupled to the interface unit 122, the resource identification unit 118 and the task scheduling unit 120. The management engine 124 is configured to execute the method according to the invention, in particular to determine the distribution of tasks for the associated computations as described below in detail.

To perform these tasks, the device 100 comprises a task scheduling unit 120, which receives queues of tasks for execution on the available processing elements, manages the execution of these queues and collects results from the available processing elements. The task scheduling unit 120 handles the exchange of data between processing elements 104, 108, 110, 114 via the computing platform interface 116 as required for the task execution.

The device 100 can further contain a logging unit 126 for storing and providing data, e.g., information on the controller synthesis acquired during execution of the method according to the invention, which may be used for debugging. For this, the logging unit 126 is coupled to the management engine 124.

The device 100 depicted in FIG. 2a only constitutes one example for an embodiment of the present invention and a variety of modifications are possible in other examples. The number of processing elements and computation devices can be different and in particular much larger than shown in FIG. 2a. A device according to the present invention may contain multiple computing devices of the same type. Furthermore, two or more of the components could be formed by a single unit providing the respective functionalities.

FIG. 2b depicts a flow diagram representing a method according to an embodiment of the present invention for synthesizing a correct-by-construction controller 20 for a control system 12, which could for example be implemented with device 100.

In a first step 130, a mathematical model of the control system 12 is received, which characterizes the response of the control system 12 to a given control vector $\vec{u}$, i.e., the change of the current state $\vec{x}$ as a result of the control input. The mathematical model can characterize the response exactly or approximately. As described above, the mathematical model can for example be a set of differential equations describing the dynamics of the control system 12. Alternatively, the mathematical model may comprise information based on which a response of the control system 12 can be determined, e.g., a Hamiltonian or Lagrangian or a set of intrinsic parameters of the control system 12.

The first step 130 further comprises receiving at least one specification for the state variables and/or the control vector. This specification can for example be one or more target states or a range of target states, which the control system 12 should reach or remain in, e.g., a certain position or velocity for an autonomous car. The specification may be given as formulae in a certain specification modeling language, e.g., linear temporal logic (LTL) formulae or automata on infinite strings. The formulae can then be translated to a corresponding set of states or tuples. The specifications may contain conditions to be imposed on the control parameters, e.g., boundaries like a maximum angle for the steering wheel or a maximum position of the throttle to limit the acceleration.

Additionally, a priority may be assigned to the specifications. For example, a speed limit may be required to be strictly enforced, whereas comfort settings like the maximum throttle position can have a lower priority.

Subsequently, the method proceeds with step 132, in which available processing elements are identified that can be used for executing computations. The step 132 is described in more detail below with reference to FIG. 3.

Afterwards, the continuous state space containing all possible state vectors and the continuous input space spanned by the input vectors u are discretized at least in part to obtain a set of tuples $(\vec{x}_i, \vec{u}_j)$, for which a symbolic model 190 and a symbolic controller is to be determined. For this, a subspace of the continuous state space and a subspace of the continuous input space are selected, wherein each subspace may contain an arbitrary part of the respective space or the entire respective space. The tuples $(\vec{x}_i, \vec{u}_j)$ are chosen from the combination of the subspaces, e.g., using a periodic pattern with a fixed spacing. The subspaces to be discretized as well as the spacings used for the discretization may be chosen based on the provided specifications, the available processing elements, the mathematical model and/or additional information on the control system 12. For example the chosen state subspace may be required to contain the target state as well as the current state. The size of the subspaces to be discretized may be limited based on properties of the control system 12, e.g., the range for the velocity of a car may be bounded by the maximum velocity of the car or the range for the position of a car may depend on the area covered by the sensors observing the surroundings of the car. The size of the subspaces and the spacings can be chosen depending on the available computing power and/or memory resources. Furthermore, the spacing can be non-uniform and can account for properties of the mathematical model, e.g., the spacing for a control parameter may be closer in regions where the state of the control system 12 depends strongly on this parameter or the spacing for a state variable may be closer in a region where the mathematical model exhibits particular features. In the case of an autonomous car, this can for example be a region in which a pedestrian or a parked car was detected.

Following the discretization, a symbolic model 190 is determined for the set 180 of tuples by a parallel computation assigning at least one successor state to each tuple based on the mathematical model as detailed below with reference to FIG. 4.

In step 138, an initial winning set 230 of tuples is determined based on the at least one specification for the state variables and/or the control vector. This initial winning set 230 can for example contain some or all of the tuples from the set 180 of tuples that meet one or more of the specifications, e.g., all tuples corresponding to a target position for a car or to a velocity range specified for a car.

Subsequently, an updated winning set 242 of tuples is obtained through a parallelized comparison of the successor states determined in step 140 with the initial winning set 230 of tuples. The step 140 is illustrated in FIG. 5 and described in more detail below.

After determining the updated winning set 242, the updated winning set 242 and the initial winning set 230 are compared with each other in step 142. From this comparison, a convergence measure is obtained, which quantifies the overlap between the two sets. This convergence measure can for example be the number or fraction of tuples that are only contained in one of the sets. This convergence measure is then compared to a predefined convergence criterion, which specifies a desired degree of similarity between the initial winning set 230 and the updated winning set 242. The convergence criterion may for example require that the two sets are identical or that the fraction of tuples which only appear in one of the sets is smaller than a certain threshold.

If the convergence measure does not meet the convergence criterion, the method returns to step 138 to determine a new updated winning set. To this end, the initial winning set 230 is replaced by the updated winning set 242 before proceeding to step 140 for the determination of the new updated winning set as described below, i.e., the previously determined updated winning set 242 is used as the initial winning set 230 when repeating step 140. Step 140 then results in a new updated winning set that replaces the updated winning set 242. In this way, the updated winning set 242 is modified iteratively until the convergence criterion is fulfilled, yielding a final winning set 244, namely the latest new updated winning set.

The same convergence criterion may be used for all iterations. Alternatively, the convergence criterion may be adapted between iterations, e.g., to ensure a completion of the method within a specified amount of time. For this, the convergence criterion can be modified depending on the number of performed iterations or a maximum number of iterations can be set.

Once the convergence measure satisfies the convergence criterion in step 142, the method proceeds to step 144, where a controller for the control system 12 is constructed using the final winning set 244, which is collected from all processing elements participating in step (140). This controller is designed such that it determines a control vector $\vec{u}$ as an output to be provided as a control input to the control system 12 in response to a state vector $\vec{x}$ received from the control system 12. The rules associating a state vector to a control vector $\vec{u}$ are determined based on the final winning set 244.

The construction of the controller can comprise determining a symbolic controller from the final winning set 244 and refining the symbolic controller to obtain the controller for the control system 12. The construction of the symbolic controller involves extracting a set of rules which uniquely identify a control vector for a given state vector, $\vec{x}_i \rightarrow \vec{u}_j$. This defines the output $\vec{u}_j$ that the controller will provide to the control system 12 when receiving the state vector $\vec{x}_{ti}$ as an input. The symbolic controller is restricted to the discretized space, i.e., the tuple $(\vec{x}_i, \vec{u}_j)$ has to be contained in the discretized space. Since the final winning set 244 may contain multiple tuples with the same state vector constructing the symbolic controller may require a determination step, wherein a unique control vector is associated with the state vector $\vec{x}_i$. This can be achieved, e.g., by randomly selecting one of the multiple tuples with the state vector $\vec{x}_i$ or by averaging $\vec{u}_j$ over two or more of the multiple tuples. Alternatively, a tuple can be chosen based on the provided specifications. For this, the specifications may contain one or more secondary specifications which can, e.g., be additional criteria that are not to be enforced strictly, but that can be optimized for if possible. Such a secondary specification could for example be that the acceleration should be as small as possible to maximize comfort for a passenger in an autonomous vehicle. In this case, the tuple resulting with the smallest acceleration would be selected. If multiple secondary specifications are provided, priorities may be assigned to the secondary specifications for the determination step.

The refinement of the symbolic controller comprises the determination of one or more rules associating a continuous state vector $\vec{x}$ to a control vector $\vec{u}$ to obtain a controller that is capable to process an input from the continuous state space. In one example, the rule could be to determine the discrete state vector $\vec{x}_i$ that is closest to the continuous state vector $\vec{x}$ and to use the symbolic controller as a look-up table to obtain the corresponding discrete control vector $\vec{u}_i$ as the output control vector it. Alternatively, an average or weighted average of the $\vec{u}_i$ associated with a plurality of discrete state vectors that are close to $\vec{x}$ may be used. In another example, an interpolation and/or extrapolation could be performed with the discrete set of rules of the symbolic controller to obtain a mathematical function mapping a state vector $\vec{x}$ to a control vector $\vec{u}(\vec{x})$.

In addition to the determination of the rules associating a state vector $\vec{x}$ to a control vector $\vec{u}$, the construction of the controller for the control system 12 can comprise generating source code that can be used to implement the controller in a control unit, in step 146. The control unit can be configured to execute the source code in order to determine a control vector for a state vector received, e.g., as a plurality of digital signals and/or analog signals and to send the control vector, e.g., as a plurality of digital signals and/or analog signals to a control system 12. The source code can be provided automatically to the control unit for implementation or can be provided to a software/hardware developer, e.g., as a source code building block.

The sequence of the steps illustrated in FIG. 2b and described above is only one particular example. As far as technically feasible, the steps can be permuted and the method and any embodiment thereof can be performed in an arbitrary order. This also applies to the order of the substeps that the steps shown in FIG. 2b are comprised of as illustrated in FIG. 3 to FIG. 5 and described below.

Figure 3:
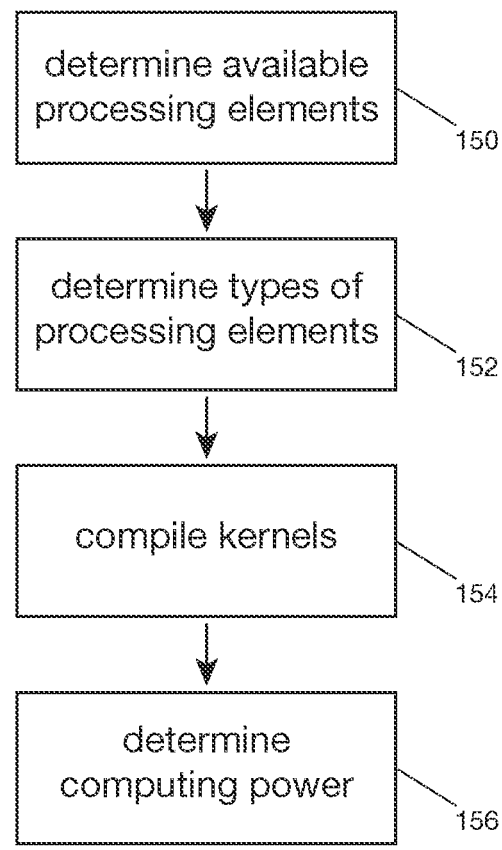
FIG. 3: a flow chart of a method to identify available processing elements according to an embodiment of the invention

In FIG. 3, an exemplary method for the determination of available processing elements in step 132 is illustrated as a flowchart. The purpose of the step 132 is to identify the processing elements which can be used at least in part for the parallel computations in step 136 and/or step 140. Furthermore, additional information on the available processing elements may be obtained, which can be useful for determining the distribution of computation tasks over the available processing elements. In step 150, the processing elements in the system that the method according to the invention is executed on are analyzed to obtain a list of processing elements which are suitable for the executing the computation tasks and are currently available, e.g., have sufficient spare computation capacities to speed up the parallel computations given their current workload. For device 100, this list might for example contain the processing elements 104, 108, 110, and 114.

Step 132 may comprise determining the type of processing elements for the available processing elements in step 152, i.e., what type of computation device they belong to. Processing element 104 would for example be identified as a CPU processing element, whereas processing element 110 would be identified as a GPU processing element. The step 152 may include obtaining further information on the processing elements, e.g., the type of CPU 102, GPU 106 or HWA 112 or specifications like the clock speed or the available memory resources.

Subsequently, in step 154, based on the information about the available processing elements, customized kernels may be compiled for executing the computations on the available processing elements. These kernels can be fine-tuned to the respective type of processing element in order to optimize the computation performance, e.g., by adapting the computations to the parallel architecture of GPUs or exploiting the large cache memory of CPUs.

In addition to the specifications of the available processing elements obtained in step 152, the actual computing power of the available processing elements may be determined in step 156, e.g., by executing some of the computations tasks for the determination of the symbolic model 190 in step 136 and/or for the determination of the updated winning set 242 in step 140 and measuring the elapsed time. This allows for more reliable estimates of the number of computation tasks a given processing element can execute in a certain amount of time and thus facilitates the efficient distribution of tasks for the parallel computations as described below.

Figure 4A:
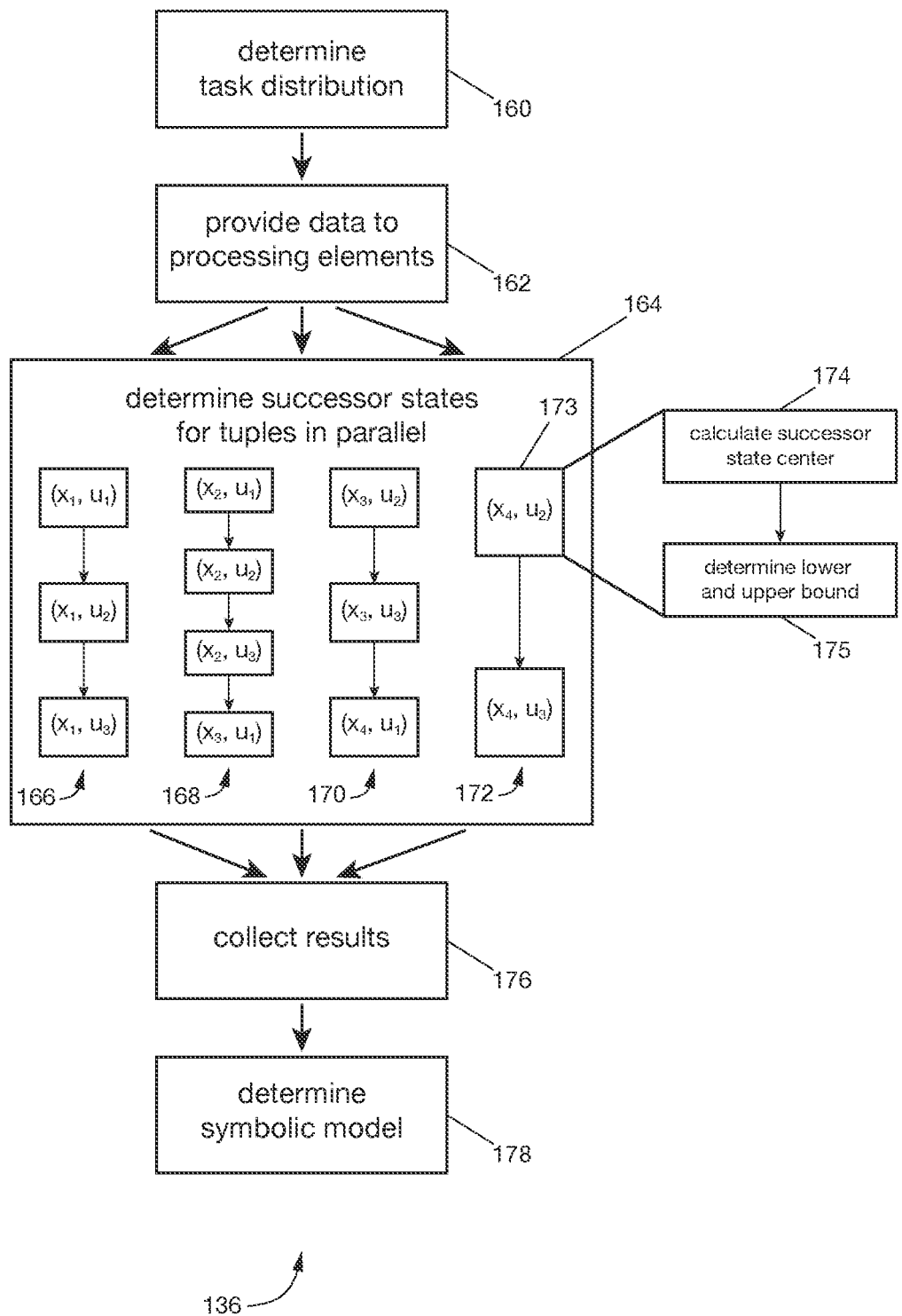
FIG. 4a: a flow chart of a method for a parallel determination of a symbolic model in accordance with an embodiment of the invention
Figure 4B:
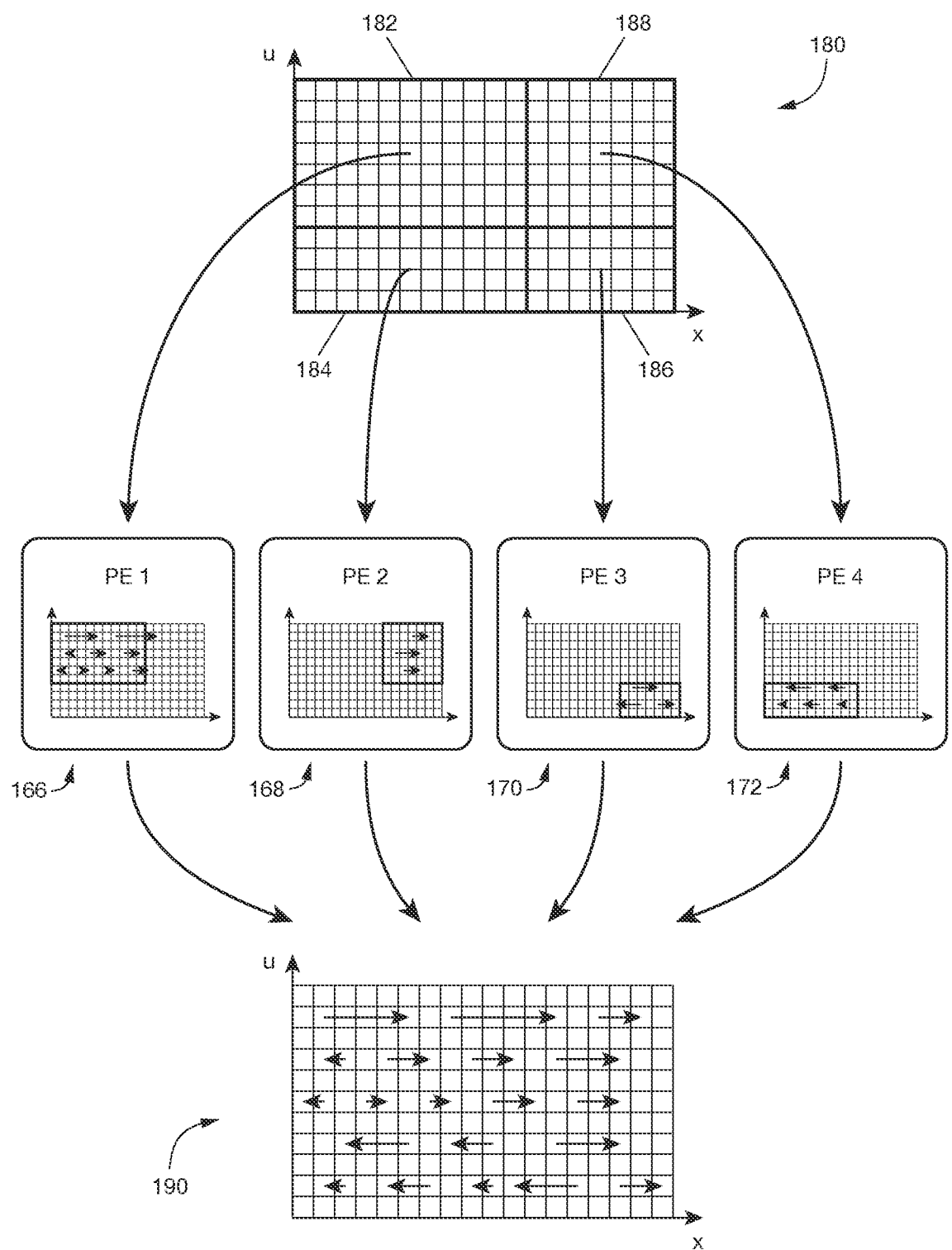
FIG. 4b: a parallel determination of a symbolic model according to an embodiment of the invention

FIG. 4a depicts a flow chart of an example for the parallel determination of the symbolic model 190 in step 136, the basic concept of which is illustrated in FIG. 4b. In FIGS. 4a and 4b, it is assumed that four processing elements are used, e.g., the processing elements 104, 108, 110, and 114 in the device 100. This only constitutes one specific example and the method and concept described in the following can easily be extended to any finite number of processing elements.

In a first step 160, a distribution of the computing tasks for the determination of the successor states over the available processing elements is determined. For this, the set 180 of tuples is divided into subsets 182, 184, 186, and 188, which when taken together contain all tuples $(\vec{x}_i, \vec{u}_j)$ of the set 180 of tuples. Each subset is assigned to a different processing element of the available processing elements, e.g., subset 182 to processing element 104, subset 184 to processing element 108, subset 186 to processing element 110, and subset 188 to processing element 114. While in general it is desirable to use as many processing elements as possible to speed up the computation, the communication overhead arising from data exchange with and between the processing elements increases with the number of processing elements involved, which may limit the computation speed at some point. In some situations it may therefore be advantageous to only use some of the available processing elements, i.e., the number of subsets may be smaller than the number of available processing elements.

The subsets 182-188 can have the same size, i.e., contain the same number of tuples. Preferably, however, the size of the subsets 182-188 is chosen individually based on information about the processing elements 104, 108, 110, and 114, in particular the types of processing elements, the available computing power of the processing elements, the memory resources of the processing elements or a combination thereof. For example, CPUs are suitable for complex serial mathematical computations and may be assigned a larger number of tasks when constructing the symbolic model, which may involve solving differential equations numerically. The computation time for the determination of the successor states can be minimized by choosing the subsets 182-188 such that the available processing elements 104, 108, 110, and 114 need the same time for executing the tasks assigned to them, i.e., the size of the subspace associated with a processing element scales with the number of successor state determinations the processing element can perform in a given amount of time. In FIG. 4b, the subsets 182-188 are chosen such that they form simply-connected areas in the flat 2D space. The tuples in each subset can, however, be chosen arbitrarily from the set 180 of tuples. Preferably, the tuples in each subset are chosen to minimize communication overhead due to data exchange with the processing elements, in particular taking into account the subsequent determination of the updated winning set 242 in step 140 as well as the potentially different data exchange rates with the processing elements and between different processing elements.

In step 162, the data required for the determination of the successor states is provided to the respective processing elements, e.g., the tuples $(\vec{x}_i, \vec{u}_j)$ for which the successor states are to be determined as well as information pertaining the mathematical model. Depending on the memory resources of the processing elements, the entire respective subset is provided at once or the subset is divided further into subsets of the subset, which are provided sequentially whenever the tasks associated with the preceding subset of the subset have been executed.

For each processing unit, a queue of tasks is established to perform the successor state determination for each tuple within the respective subset, e.g., a queue 166 for processing element 104, a queue 168 for processing element 108, a queue 170 for processing element 110, and a queue 172 for processing element 114. Each queue 166, 168, 170, 172 contains multiple sequences of tasks, wherein each sequence of tasks comprises the tasks for determining the at least one successor state $\vec{x}_f$ for one tuple $(\vec{x}_i, \vec{u}_j)$. This is illustrated in FIG. 4a for a situation, in which the set 180 of tuples contains twelve tuples with i ∈ [1,4] and j ∈ [1,3]. In the sequence 173 of tasks, the at least one successor state for the tuple $(\vec{x}_4, \vec{u}_2)$ is determined. The queues 166, 168, 170, 172 of tasks are sent to the respective processing elements and executed in step 164. The execution is performed in parallel at least in part as indicated by the vertical alignment of the queues 166, 168, 170, 172 of tasks. Preferably, the subsets 182-188 are chosen such that each processing element finishes the execution of the respective queue of tasks at the same time.

For each tuple $(\vec{x}_i, \vec{u}_j)$, the at least one successor state $\vec{x}_f$ is determined based on the mathematical model. The at least one successor state can for example be a state that the control system 12 is expected to be in according to the mathematical model, if the control system 12 is initially in the state $\vec{x}_i$ and the control input $\vec{u}_j$ is applied for a predetermined amount of time. This predetermined amount of time can be chosen depending on the control system 12, the mathematical model and/or the method used for determining the at least one successor state. If the mathematical model is a set of differential equations governing the dynamics of the control system 12 or if a set of such differential equations can be derived from the mathematical model, the at least one successor state may be determined by numerically solving the set of differential equations at least in part, e.g., via a Runge-Kutta method or a linear multistep method. Preferably, the at least one successor state is contained in the discretized state space. If the at least one successor state is not contained in the discretized state space, e.g., if it lies between two states from the discretized state space, it may be approximated by the closest state from the discretized state space. Furthermore, if a successor state lies outside of the range of the discretized state space, it may be marked in some way to indicate an out-of-bound state.

The at least one successor state can be more than one successor state, e.g., to account for uncertainties in the determination of the state vector, the application of the control vector, the mathematical model and/or the numerical methods. For example, a successor state center may be calculated in step 174, i.e., the state that the control system 12 is expected to be in according to the mathematical model, if the control system 12 is initially in the state $\vec{x}_i$ and the control input $\vec{u}_j$ is applied for the predetermined amount of time. Subsequently, in step 175 a lower bound and an upper bound for the successor state center can be determined, which define a hyper-rectangle in the state space, e.g., as an estimate for the uncertainties. For this, a set of successor states may be determined, for example by calculating successor states for a plurality of state vectors and/or a plurality of control vectors, e.g., within predetermined uncertainty ranges around $\vec{x}_i$ and $\vec{u}_j$ respectively, and/or by determining additional successor states for each calculated successor state, e.g., by adding or subtracting a predetermined uncertainty. The set of successor states can be approximated by the lower and upper bound, e.g., by choosing a hyper-rectangle in the state space that contains the entire set or a certain fraction of states from the set. The at least one successor state can then be defined as the set comprising the lower bound and the upper bound. The at least one successor state may additionally contain the successor state center as well. Alternatively, the at least one successor state may comprise the entire set of successor states or a subset of the set of successor states. To reduce the memory requirements, the at least one successor state preferably is a small number of successor states characterizing the set of successor states, e.g., one or more lower bounds and one or more upper bounds defining a hyper-volume in state space.

In step 176, the results of the computations in step 164 are collected by obtaining the at least one successor state for each tuple from the respective processing element. This collection may be performed once the entire queue of tasks for a given processing element has been executed or the data may be collected sequentially whenever a sequence of tasks has been executed. Subsequently, the data for all tuples is combined in step 178 to form the symbolic model 190. The symbolic model 190 contains transition rules for each tuple $(\vec{x}_i, \vec{u}_j)$ in the set 180 of tuples, with each rule associating one of the at least one successor state to the tuple $(\vec{x}_i, \vec{u}_j)$. Thus, if the at least one successor state consist of a lower bound and upper bound, there are two rules per tuple, one defining the transition to the state corresponding to the lower bound and a second one defining the transition to the state corresponding to the upper bound.

In other examples of embodiments of the method according to the present invention, the steps 176 and 178 may be modified or omitted altogether, e.g., to reduce the communication overhead associated with the exchange of data with processing elements. For example, a symbolic model covering only the respective subspace may be determined directly on a processing element. Alternatively, the at least one successor state may be collected and/or exchanged between the processing elements only for some of the tuples in the subsets 182-188, e.g., to determine a symbolic model covering the subset used for the determination of the updated targets set in step 140 for each processing element.

Figure 5A:
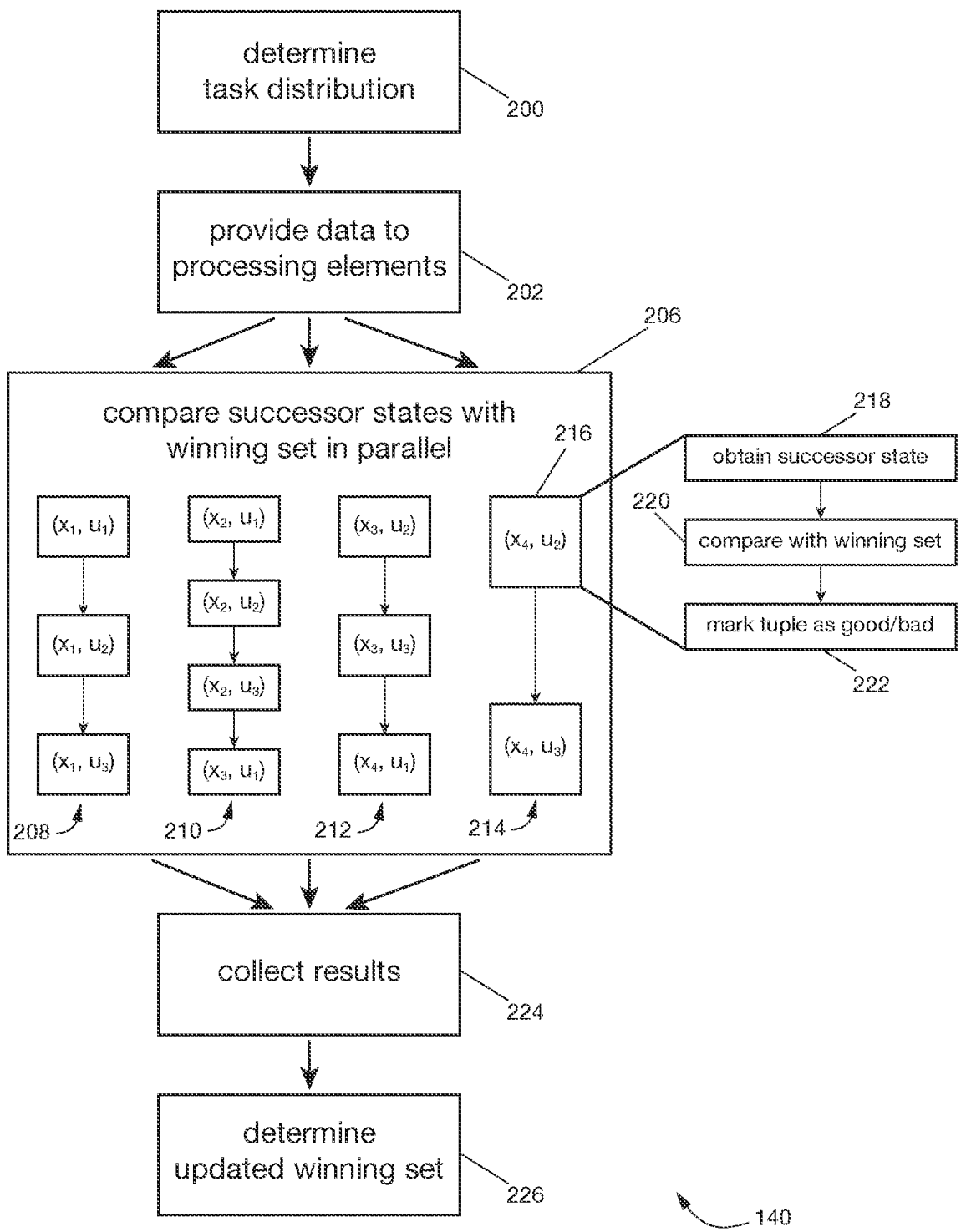
FIG. 5a: a flow chart of a method for a parallel determination of an updated winning set in accordance with an embodiment of the invention
Figure 5B:
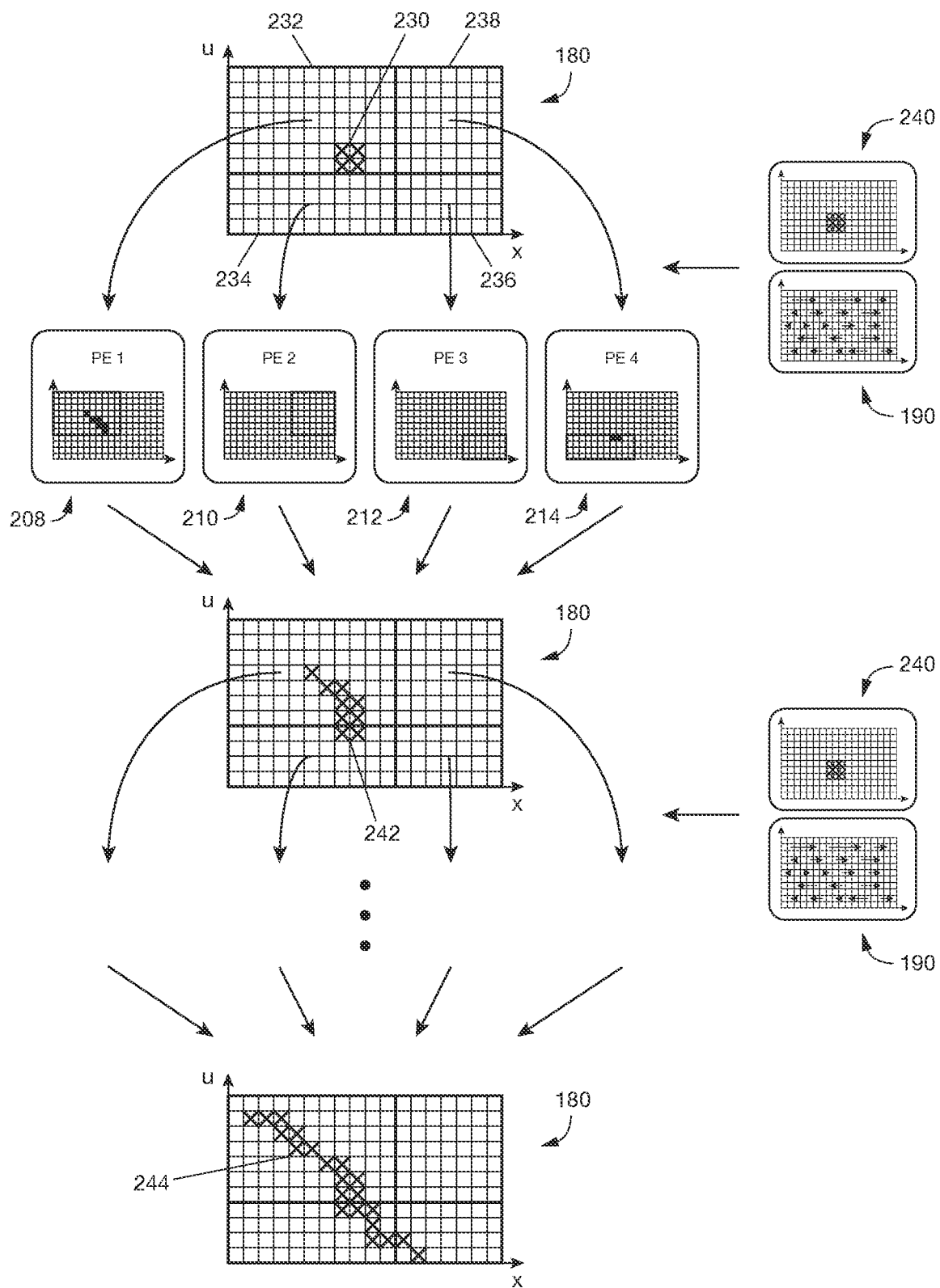
FIG. 5b: a parallel determination of an updated winning set according to an embodiment of the invention

FIG. 5a shows an exemplary flowchart for the parallel determination of an updated winning set 242 in step 140 using four processing elements, e.g., the processing elements 104, 108, 110, and 114 in the device 100. An illustration of this process is depicted in FIG. 5b. As for FIGS. 4a and 4b, this number of processing elements is only a specific example and the method and concept described in the following can easily be extended to any finite number of processing elements.

In step 200, a distribution over the available processing elements is determined for the computing tasks for the comparison between the initial winning set 230 and the at least one successor state for each tuple in the set 180 of tuples. The procedure for this is similar to step 160. The set 180 of tuples is divided into subsets 232, 234, 236, and 238, which when taken together contain all tuples $(\vec{x}_i, \vec{u}_j)$ of the set 180 of tuples. Each subset is assigned to a different processing element of the available processing elements, e.g., subset 232 to processing element 104, subset 234 to processing element 108, subset 236 to processing element 110, and subset 238 to processing element 114. The size and tuples for each of the subsets 232-238 are chosen in a similar way as described above for the subsets 182-188. For the iterative determination of the final winning set 244 as described above the communication overhead is of particular importance as data has to be exchanged between processing elements multiple times. The number of processing elements and thus the number of subspaces used in step 140 may be different from the one used in step 132. For example, GPUs contain many processing elements, which allow for a massive parallelization of computing tasks, and can thus be particularly suitable for the comparison with the initial winning set 230 as well as for computing the updated winning set.

Subsequently, the data required for the computing tasks assigned to a processing element is provided to the respective processing element in step 202, in particular data relating to the corresponding subset, the initial winning set 230, the symbolic model 190 and the specifications 240. To reduce the amount of data that has to be exchanged, only the data which is relevant for the corresponding subset may be provided. Depending on the memory resources of each processing element, the data may be provided at once or sequentially during the execution of the tasks. As mentioned above, the symbolic model 190 may at least in part already be stored by the processing elements.

For each processing unit, a queue of tasks is established to perform the comparison for each tuple within the respective subset, e.g., a queue 208 for processing element 104, a queue 210 for processing element 108, a queue 212 for processing element 110, and a queue 214 for processing element 114. Each queue contains multiple sequences of tasks, wherein each sequence of tasks comprises the tasks for comparing the at least one successor state of a tuple with the initial winning set 230. This is illustrated in FIG. 5a for a situation, in which the set 180 of tuples $(\vec{x}_i, \vec{u}_j)$ contains twelve tuples with i ∈ [1,4] and j ∈ [1,3]. In the sequence 216 of tasks, this comparison is performed for the tuple $(\vec{x}_4, \vec{u}_2)$. The queues 208, 210, 212, 214 of tasks are sent to respective the processing elements and executed in step 206. The execution is performed in parallel at least in part as indicated by the vertical alignment of the queues 208, 210, 212, 214 of tasks. Preferably, the subsets 232-238 are chosen such that each processing element finishes the execution of the respective queue of tasks at the same time.

In a sequence of tasks like the sequence 216, the at least one successor state $\vec{x}_f$ for the respective tuple is obtained, e.g., from a memory associated with the processing element, and subsequently compared with the initial winning set 230. Based on this comparison, the tuple is marked as good or bad to indicate whether it should be included in the updated winning set 242. The tuple can for example be marked as good if the initial winning set 230 contains at least one tuple $(\vec{x}_k, \vec{u}_l)$ with $\vec{x}_k = \vec{x}_f$ for each of the at least one successor state, or for a certain number or fraction of states of the at least one successor state. Alternatively, if the at least one successor state contains a lower bound and an upper bound, the tuple may be marked as good if all of the tuples in the set 180 of tuples that are enclosed by a hyper-rectangle defined by the lower and upper bound, or a certain number or fraction of these tuples are part of the initial winning set 230. Tuples to be marked as good may additionally be required to already be contained in the initial winning set 230. The specifications 240 may contain further conditions which have to be fulfilled as well by tuples to be marked as good.

The tuples marked as good in step 206 are collected from the available processing elements in step 224 and then combined to obtain the updated winning set 242 in step 226. The updated winning set 242 is compared with the initial winning set 230 in step 142 obtain a convergence measure as described above. Alternatively, the available processing elements may perform a comparison of the tuples marked as good in their subset with the corresponding subset of the initial winning set 230 and only provide information pertaining this comparison for the convergence check.

If an additional iteration is to be performed following the convergence check in step 142, data relating to the updated winning set 242 is provided to the processing elements as in step 202 to replace the data relating to the initial winning set 230. To reduce the amount of data that has to be exchanged, information may be provided only about tuples which have been added and/or removed in the updated winning set 242 as compared to the initial winning set 230 and are relevant for the corresponding subset. Subsequently, steps 206, 224, and 226 may be repeated to obtain a new updated winning set. For this, the same task distribution as in the previous iteration may be used or alternatively step 200 may be repeated to obtain a new distribution of tasks prior to repeating step 206.

This procedure is repeated until the convergence criterion is met for the new updated winning set 244, at which point the method proceeds to the controller construction in step 144 as detailed above.

The embodiments of the present invention disclosed herein only constitute specific examples for illustration purposes. The present invention can be implemented in various ways and with many modifications without altering the underlying basic properties. Therefore, the present invention is only defined by the claims as stated below.

LIST OF REFERENCE SIGNS

- 10—Controller
- 12—Control system
- 14—Symbolic model
- 16—Specifications
- 18—Symbolic controller
- 20—Refined controller
- 100—Device for synthesizing a correct-by-construction controller
- 102—Central processing unit (CPU)
- 104—Processing element
- 106—Graphics processing unit (GPU)
- 108—Processing element
- 110—Processing element
- 112—Hardware accelerator (HWA)
- 114—Processing element
- 116—Computing platform interface
- 118—Resource identification unit
- 120—Task scheduling unit
- 122—Interface unit
- 124—Management engine
- 126—Logging unit
- 130—Step of receiving the mathematical model and specifications
- 132—Step of identifying available processing elements
- 134—Step of discretizing the space
- 136—Step of determining the symbolic model
- 138—Step of obtaining the initial winning set
- 140—Step of determining the updated winning set
- 142—Step of checking the convergence
- 144—Step of constructing the correct-by-construction controller
- 146—Step of generating source code for implementing the correct-by construction controller
- 150—Step of determining available processing elements
- 152—Step of determining the type of the available processing elements
- 154—Step of compiling kernels for executing computations on available processing elements
- 156—Step of determining the computing power of the available processing elements
- 160—Step of determining the task distribution for determining the symbolic model
- 162—Step of providing data to processing elements for successor state determination
- 164—Step of the parallel determination of successor states
- 166—Queue of tasks
- 168—Queue of tasks
- 170—Queue of tasks
- 172—Queue of tasks
- 173—Sequence of tasks
- 174—Step of calculating a successor state center
- 175—Step of determining the lower bound and the upper bound for a set of successor states
- 176—Step of collecting results from the parallel determination of successor states
- 178—Step of determining the symbolic model from the collected data
- 180—Set of tuples
- 182—Subset of the set of tuples
- 184—Subset of the set of tuples
- 186—Subset of the set of tuples
- 188—Subset of the set of tuples
- 190—Symbolic model
- 200—Step of determining the task distribution for determining the updated winning set
- 202—Step of providing data to processing elements for updated winning set determination
- 206—Step of comparing successor states with initial winning set in parallel
- 208—Queue of tasks
- 210—Queue of tasks
- 212—Queue of tasks
- 214—Queue of tasks
- 216—Sequence of tasks
- 218—Step of obtaining successor state from memory
- 220—Step of comparing successor state with initial winning set
- 222—Step of determining marking tuples to be included in updated winning set 224—Step of collecting results of successor state comparison
226—Step of determining the updated winning set based on successor state comparison
230—Initial winning set
232—Subset of the set of tuples
234—Subset of the set of tuples
236—Subset of the set of tuples
238—Subset of the set of tuples
240—Specifications
242—Updated winning set
244—Final updated winning set The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for synthesizing a correct-by-construction controller for a control system, the method comprising the following steps:

receiving a mathematical model of the control system with a plurality of state variables $\vec{x}$ and a plurality of control parameters $\vec{u}$, wherein the mathematical model characterizes at least in part the change of the state variables $\vec{x}$ in response to the control parameters $\vec{u}$ as a control input;

receiving at least one specification for one or both of the state variables $\vec{x}$ and/or the control parameters $\vec{u}$;

identifying available processing elements;

discretizing at least a part of a space spanned by $(\vec{x}, \vec{u})$ to obtain a set of tuples $(\vec{x}_i, \vec{u}_j)$, where i and j are indices labelling the state vectors and control vectors, respectively;

determining, based on the mathematical model, for each tuple $(\vec{x}_i, \vec{u}_j)$ in the set of tuples at least one successor state $\vec{x}_f$;

obtaining an initial winning set of tuples based on the at least one specification;

determining an updated winning set of tuples, wherein the determination comprises:

comparing the at least one successor state $\vec{x}_f$ of each tuple with the initial winning set of tuples, wherein the comparison is distributed over the available processing elements by choosing one processing element from the available processing elements for each tuple to perform the comparison and wherein the available processing elements are used simultaneously at least in part;

receiving information pertaining the comparison from the available processing elements; and determining the updated winning set of tuples based on the information;

comparing the updated winning set with the initial winning set to obtain a convergence measure;

repeating the determination of the updated winning set of tuples to obtain a new updated winning set of tuples if the convergence measure does not meet a predefined convergence criterion, wherein the previous updated winning set of tuples is used as the initial winning set for the determination and is provided at least in part to the available processing elements; and constructing a controller for the control system from the new updated winning set.

2. The method according to claim 1, wherein the determination of the successor states is distributed over the available processing elements by choosing one processing element from the available processing elements for each tuple to determine $\vec{x}_f$ and the available processing elements are used simultaneously at least in part for the determination of the successor states.

3. The method according to claim 1, wherein identifying the available processing elements comprises determining a type of processing element for each available processing element, and wherein the comparison of the successor states with the initial winning set is adapted to the type of processing element for each available processing element.

4. The method according to claim 3, wherein the distribution over the available processing elements for the comparison of the successor states with the initial winning set is determined based on the types of the available processing elements, an available computing power of the available processing elements, available memory resources of the available processing elements, or a combination thereof.

5. The method according to claim 1, wherein the distribution over the available processing elements for the comparison of the successor states with the initial winning set is determined taking into account a communication overhead for exchanging data with the available processing elements.

6. The method according to claim 1, wherein the determination of the updated winning set of tuples to obtain a new updated winning set of tuples is repeated until the convergence measure obtained by comparing the new updated winning set with the previous updated winning set meets the predefined convergence criterion.

7. The method according to claim 1, wherein constructing the controller comprises:

constructing a symbolic controller from the new updated winning set of tuples, and refining the symbolic controller to obtain the controller.

8. The method according to claim 1, wherein determining the at least one successor state $\vec{x}_f$ comprises determining an upper and lower bound for a set of successor states.

9. The method according to claim 1, wherein the discretization of at least a part of the space spanned by $(\vec{x}, \vec{u})$ comprises mapping the part of the space spanned by $(\vec{x}, \vec{u})$ to a lower-dimensional space.

10. The method according to claim 1, wherein the discretization of at least a part of the space spanned by $(\vec{x}, \vec{u})$ is determined based on one or more of the mathematical model, the at least one specification, and information pertaining the available processing elements.

11. The method according to claim 1, wherein the mathematical model comprises a system of differential equations and determining the successor states $\vec{x}_f$ comprises numerically solving the system of differential equations at least in part.

12. The method according to claim 1, wherein comparing the at least one successor state $\vec{x}_f$ of each tuple ($\vec{x}_i$, $\vec{u}_j$) with the initial winning set of tuples comprises determining for at least one of the at least one successor state of the tuple ($\vec{x}_i$, $\vec{u}_j$) whether the initial winning set contains at least one tuple ($\vec{x}_k$, $\vec{u}_l$) with $\vec{x}_k = \vec{x}_f$, where k and l are indices labelling the state vectors and control vectors, respectively, and wherein the updated winning set contains all tuples ($\vec{x}_i$, $\vec{u}_j$) with successor states $\vec{x}_f$ for which the initial winning set contains the tuple ($\vec{x}_i$, $\vec{u}_j$) and contains at least one tuple ($\vec{x}_k$, $\vec{u}_l$) with $\vec{x}_k = \vec{x}_f$ for each of the at least one successor state of the tuple ($\vec{x}_i$, $\vec{u}_j$).

13. The method according to claim 1, wherein the convergence measure quantifies the overlap of the updated winning set with the initial winning set and the predefined convergence criterion specifies a minimum absolute or relative overlap.

14. The method according to claim 1, wherein the control system is a computer-controlled physical system, and wherein at least one of the state variables characterizes a position or velocity of a mechanical element of the control system.

15. The method according to claim 1, wherein the method is performed in real time during operation of the control system, and wherein the method is performed repeatedly with a fixed frequency or whenever updated specifications are provided or whenever the state of the control system has changed.

16. A computer program comprising computer-readable instructions, wherein the instructions, when executed by a computer device, cause the computer device to implement a method for synthesizing a correct-by-construction controller for a control system by:
  receiving a mathematical model of the control system with a plurality of state variables $\vec{x}$ and a plurality of control parameters $\vec{u}$ wherein the mathematical model characterizes at least in part the change of the state variables $\vec{x}$ in response to the control parameters $\vec{u}$ as a control input;
  receiving at least one specification for one or both of the state variables $\vec{x}$ and the control parameters $\vec{u}$;
  identifying available processing elements;
  discretizing at least a part of a space spanned by ($\vec{x}$, $\vec{u}$) to obtain a set of tuples ($\vec{x}_i$, $\vec{u}_j$), where i and j are indices labelling the state vectors and control vectors, respectively;
  determining, based on the mathematical model, for each tuple ($\vec{x}_i$, $\vec{u}_j$) in the set of tuples at least one successor state $\vec{x}_f$;
  obtaining an initial winning set of tuples based on the at least one specification;
  determining an updated winning set of tuples, wherein the determination comprises:
    comparing the at least one successor state $\vec{x}_f$ of each tuple with the initial winning set of tuples, wherein the comparison is distributed over the available processing elements by choosing one processing element from the available processing elements for each tuple to perform the comparison and wherein the available processing elements are used simultaneously at least in part;
    receiving information pertaining the comparison from the available processing elements; and
    determining the updated winning set of tuples based on the information;
  comparing the updated winning set with the initial winning set to obtain a convergence measure;
  repeating the determination of the updated winning set of tuples to obtain a new updated winning set of tuples if the convergence measure does not meet a predefined convergence criterion, wherein the previous updated winning set of tuples is used as the initial winning set for the determination and is provided at least in part to the available processing elements; and
  constructing a controller for the control system from the new updated winning set.

17. A device for synthesizing a correct-by-construction controller for a control system, wherein the device comprises:
  at least two processing elements;
  a computing platform interface coupled to the at least two processing elements for exchanging data with the at least two processing elements;
  a resource identification unit coupled to the computing platform interface for identifying available processing elements of the at least two processing elements;
  an interface unit for:
    receiving a mathematical model of the control system with a plurality of state variables $\vec{x}$ and a plurality of control parameters $\vec{u}$, wherein the mathematical model characterizes at least in part the change of the state variables $\vec{x}$ in response to the control parameters $\vec{u}$ as a control input,
    receiving at least one specification for one or both of the state variables $\vec{x}$ and the control parameters $\vec{u}$, and
    providing the synthesized controller;
  a management engine coupled to the resource identification unit and the interface unit; and
  a task scheduling unit coupled to the computing platform interface and the management engine, wherein the device is configured to execute a method for synthesizing a correct-by-construction controller for a control system by:
    receiving the mathematical model of the control system and the at least one specification;
    identifying the available processing elements;
    discretizing at least a part of a space spanned by ($\vec{x}$, $\vec{u}$) to obtain a set of tuples ($\vec{x}_i$, $\vec{u}_j$), where i and j are indices labelling the state vectors and control vectors, respectively;
    determining, based on the mathematical model, for each tuple ($\vec{x}_i$, $\vec{u}_j$) in the set of tuples at least one successor state $\vec{x}_f$;
    obtaining an initial winning set of tuples based on the at least one specification;
    determining an updated winning set of tuples, wherein the determination comprises:
      comparing the at least one successor state $\vec{x}_f$ of each tuple with the initial winning set of tuples, wherein the management engine is configured to determine a distribution over the available processing elements for the comparison by choosing one processing element from the available processing elements for each tuple to perform the comparison and wherein the management engine is further configured to determine corresponding queues of tasks for execution on the available processing elements, the task scheduling unit being configured to receive the queues of tasks from the management engine and to manage the execution of the queues of tasks on the available processing elements, wherein the available processing elements are used simultaneously at least in part;

receiving information pertaining the comparison from the available processing elements; and determining the updated winning set of tuples based on the information;

comparing the updated winning set with the initial winning set to obtain a convergence measure;

repeating the determination of the updated winning set of tuples to obtain a new updated winning set of tuples if the convergence measure does not meet a predefined convergence criterion, wherein the previous updated winning set of tuples is used as the initial winning set for the determination and is provided at least in part to the available processing elements; and constructing the controller for the control system from the new updated winning set.

18. The device according to claim 17, wherein the management engine is further configured to determine a distribution over the available processing elements for the determination of the successor states and to determine corresponding queues of tasks for execution on the available processing elements.

19. The device according to claim 17, wherein the resource identification unit is configured to determine a computing power of the available processing elements by executing tasks associated with one or both of the determination of the successor states and the comparison of the successor states with the initial winning set on the available processing elements.

20. The device according to claim 17, wherein the interface unit is configured to receive the mathematical model of the control system and the at least one specification and to provide the synthesized controller via a computer network.

* * * * *